United States Patent
Fujiwara et al.

(10) Patent No.: US 10,680,237 B2
(45) Date of Patent: Jun. 9, 2020

(54) ACTIVE MATERIAL-EXFOLIATED GRAPHITE COMPOSITE, NEGATIVE ELECTRODE MATERIAL FOR LITHIUM ION SECONDARY BATTERY, AND LITHIUM ION SECONDARY BATTERY

(71) Applicant: SEKISUI CHEMICAL CO., LTD., Osaka, Osaka (JP)

(72) Inventors: Akihiko Fujiwara, Osaka (JP); Shoji Nozato, Osaka (JP); Akira Nakasuga, Osaka (JP); Hiroshi Yoshitani, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 75 days.

(21) Appl. No.: 15/528,493

(22) PCT Filed: Mar. 22, 2016

(86) PCT No.: PCT/JP2016/059024
§ 371 (c)(1),
(2) Date: May 19, 2017

(87) PCT Pub. No.: WO2016/152869
PCT Pub. Date: Sep. 29, 2016

(65) Prior Publication Data
US 2017/0263922 A1    Sep. 14, 2017

(30) Foreign Application Priority Data
Mar. 24, 2015  (JP) .................................. 2015-060870

(51) Int. Cl.
*H01M 4/36* (2006.01)
*H01M 4/133* (2010.01)
(Continued)

(52) U.S. Cl.
CPC ......... *H01M 4/364* (2013.01); *H01M 2/1673* (2013.01); *H01M 4/133* (2013.01);
(Continued)

(58) Field of Classification Search
None
See application file for complete search history.

(56) References Cited

U.S. PATENT DOCUMENTS

| | | |
|---|---|---|
| 2009/0186273 A1 | 7/2009 | Lee et al. |
| 2009/0208844 A1 | 8/2009 | Kepler et al. |

(Continued)

FOREIGN PATENT DOCUMENTS

| | | |
|---|---|---|
| JP | 2009-129914 A | 6/2009 |
| JP | 2009-535776 A | 10/2009 |

(Continued)

OTHER PUBLICATIONS

Park, J.S. et al., "Edge-Exfoliated Graphites for Facile Kinetics of Delithiation." ACS Nano, 2012, 6 (12), pp. 10770-10775 (Year: 2012).*

(Continued)

*Primary Examiner* — Alix E Eggerding
(74) *Attorney, Agent, or Firm* — Cheng Law Group, PLLC

(57) ABSTRACT

There is provided an active material-exfoliated graphite composite that allows a lithium ion secondary battery to be obtained in which the initial capacity is large and deterioration in charge and discharge cycle characteristics is less likely to occur, when used for a negative electrode material for lithium ion secondary batteries. An active material-exfoliated graphite composite comprising: partially exfoliated graphite having a structure in which graphite is partially exfoliated; and an active material that is in the form of particles capable of intercalating and deintercalating lithium (Continued)

ions by composite formation with the partially exfoliated graphite, or particles capable of adsorbing and desorbing lithium ions by composite formation with the partially exfoliated graphite, wherein the active material has an average particle diameter of 1 μm or more and 100 μm or less.

13 Claims, 9 Drawing Sheets

(51) Int. Cl.
      *H01M 2/16*     (2006.01)
      *H01M 4/38*     (2006.01)
      *H01M 4/587*     (2010.01)
      *H01M 4/62*     (2006.01)
      *H01M 10/0525*     (2010.01)
      *H01M 4/134*     (2010.01)
      *H01M 4/02*     (2006.01)

(52) U.S. Cl.
    CPC ............ *H01M 4/386* (2013.01); *H01M 4/587* (2013.01); *H01M 4/622* (2013.01); *H01M 10/0525* (2013.01); *H01M 4/134* (2013.01); *H01M 2004/027* (2013.01)

(56) References Cited

U.S. PATENT DOCUMENTS

2010/0273058 A1* 10/2010 Lee .................... H01M 4/133
                                                                   429/225

2012/0070712 A1* 3/2012 Carlson ................ H01M 2/166
                                                                   429/129
2014/0227600 A1   8/2014   Kachi
2015/0270534 A1   9/2015   Nozato et al.
2017/0084913 A1   3/2017   Misaki et al.

FOREIGN PATENT DOCUMENTS

JP         2016-110969 A     6/2016
TW        201442953 A    11/2014
WO    WO-2013/027686 A1   2/2013
WO    WO-2014/136609 A1   9/2014
WO    WO-2015/146864 A1  10/2015

OTHER PUBLICATIONS

International Search Report for the Application No. PCT/JP2016/059024 dated Jun. 28, 2016.

Written Opinion of the International Searching Authority (PCT/ISA/237) for Application No. PCT/JP2016/059024 dated Jun. 28, 2016.

Written Opinion of the International Searching Authority (PCT/ISA/237) for Application No. PCT/JP2016/059024 dated Jun. 28, 2016 (English Translation dated Oct. 5, 2017.

Taiwanese Office Action for the Application No. 10820433210 dated May 8, 2019.

Notification of Reasons for Refusal for the Application No. 2016-518778 from Japan Patent Office dated Oct. 1, 2019.

* cited by examiner

[FIG. 1]
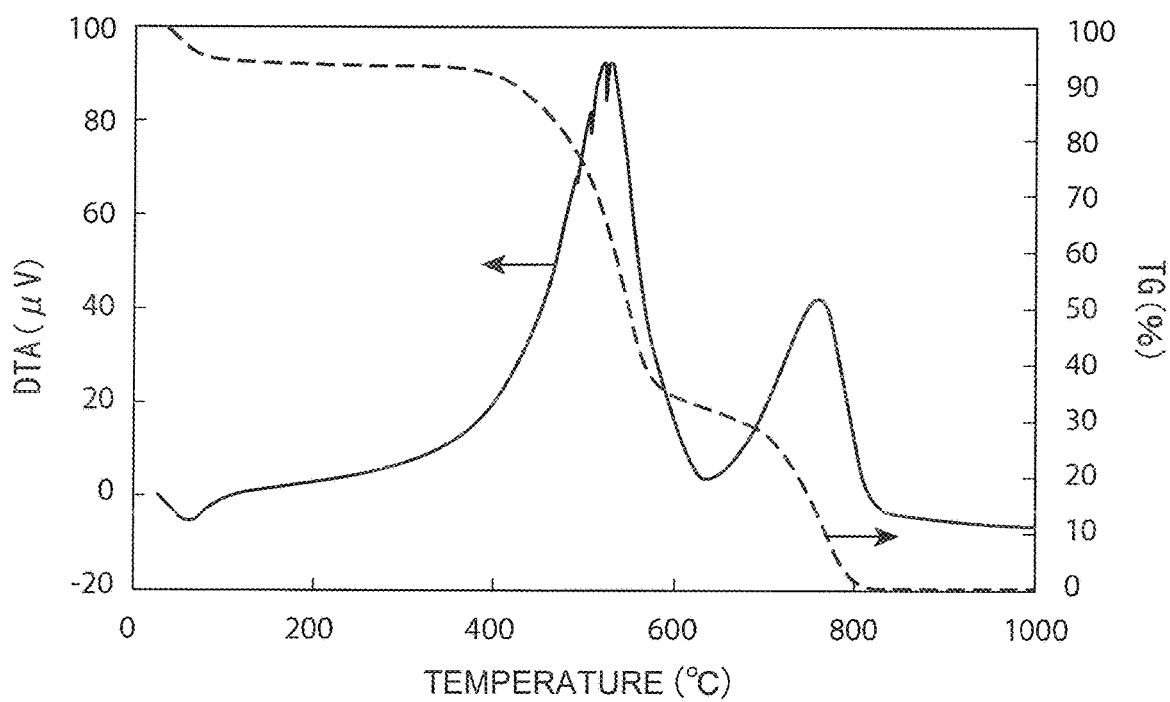
[FIG. 2]
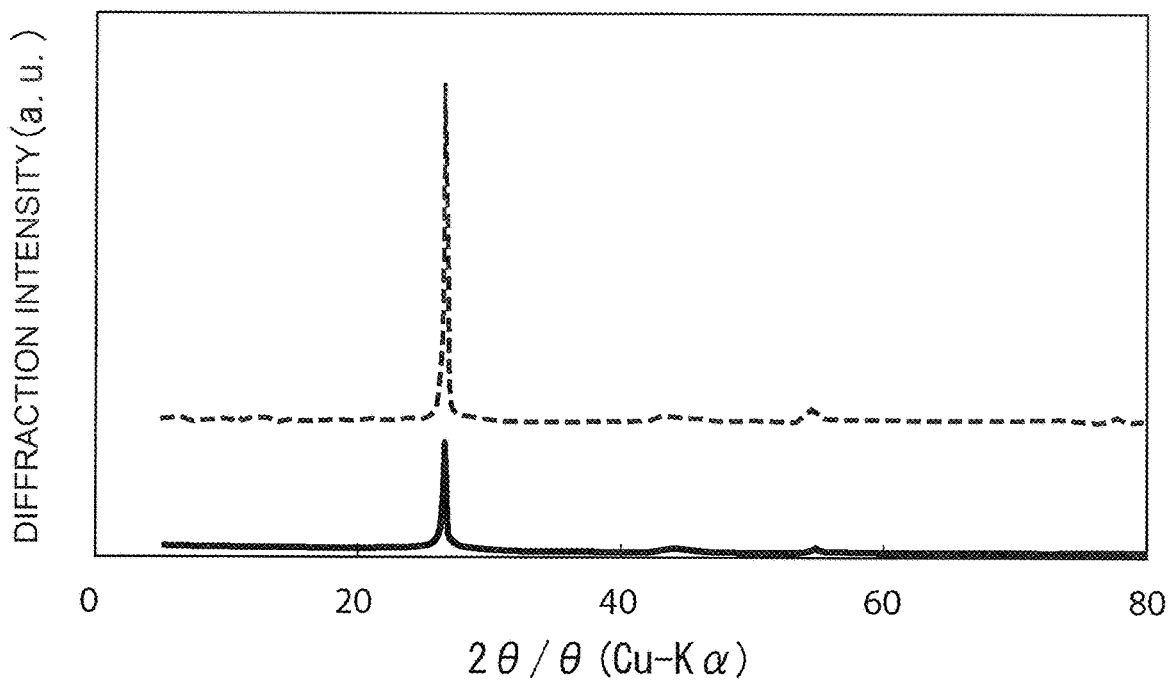

[FIG. 3]
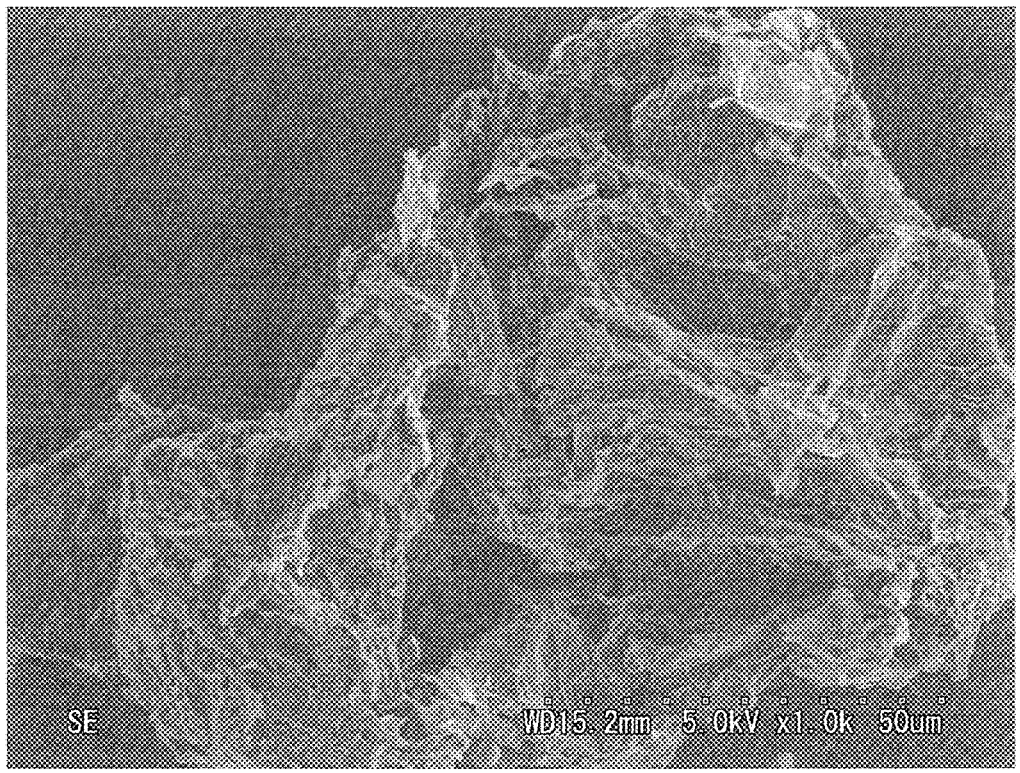
[FIG. 4]
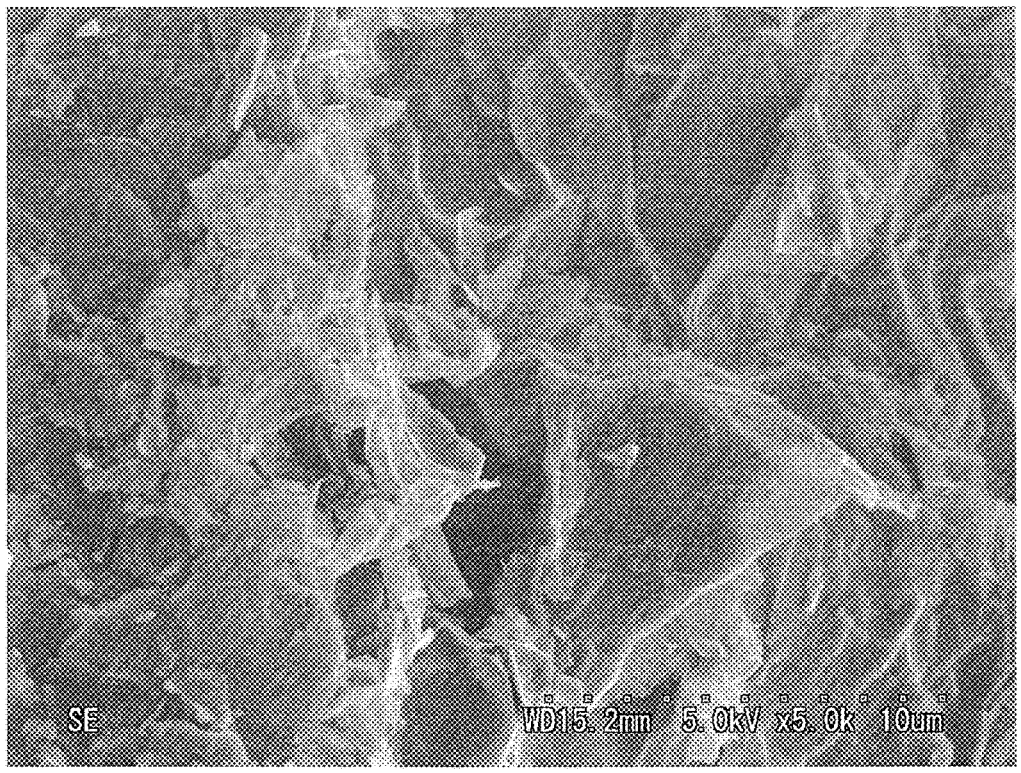

[FIG. 5]
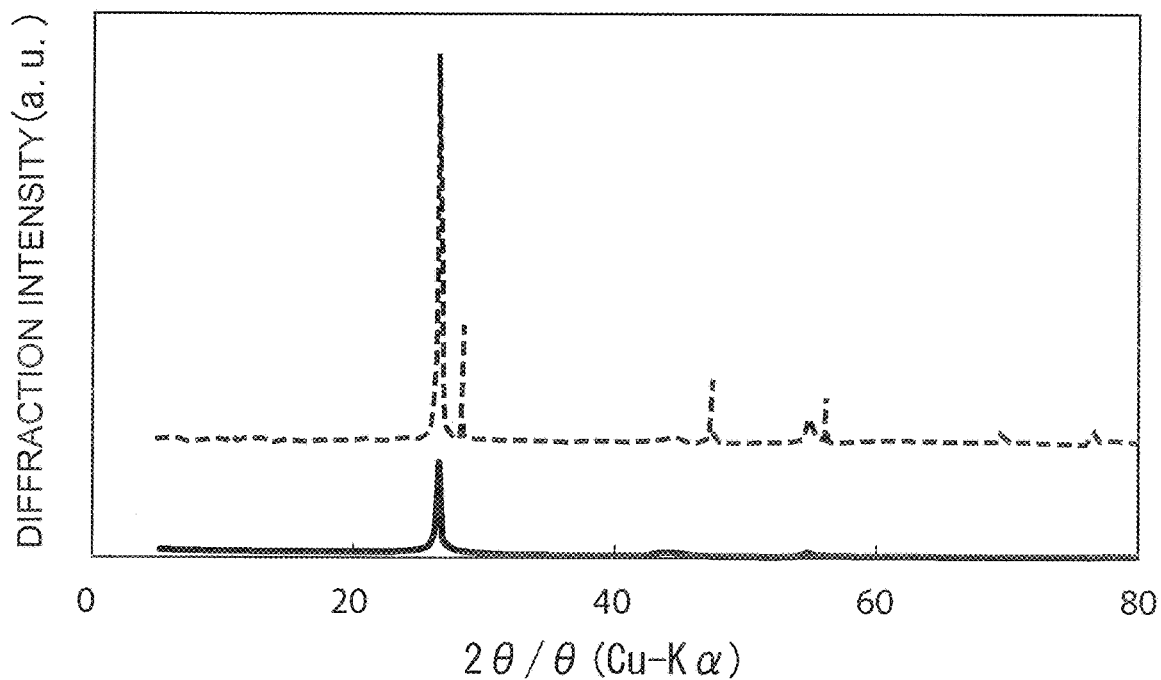
[FIG. 6]
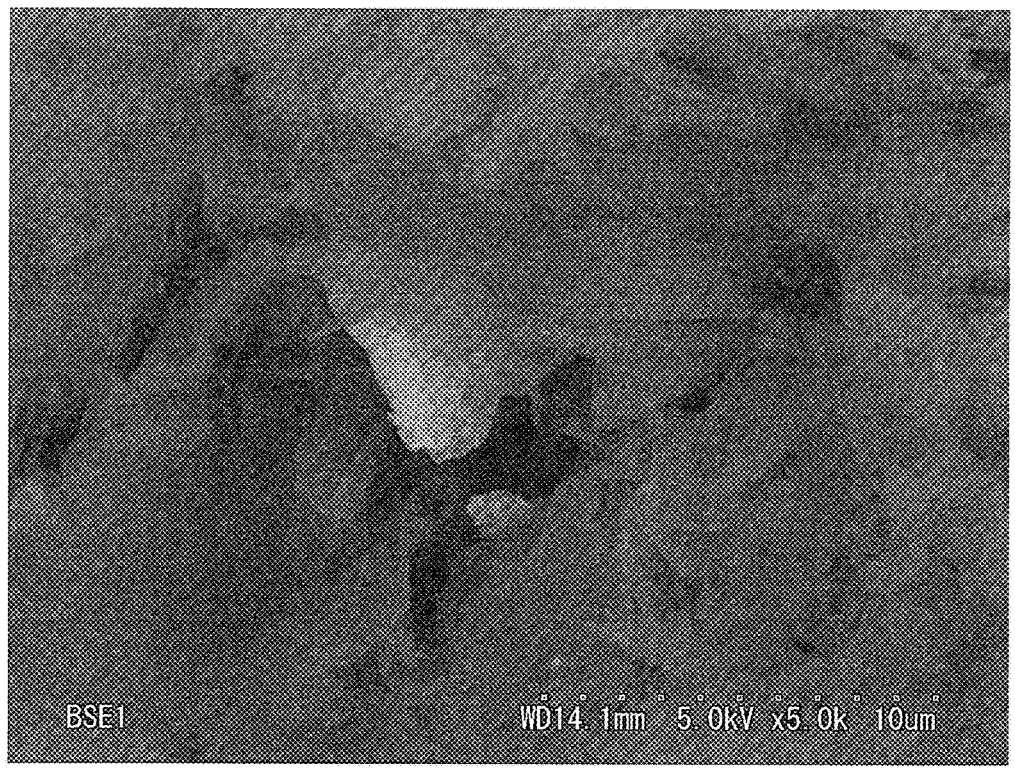

[FIG. 7]
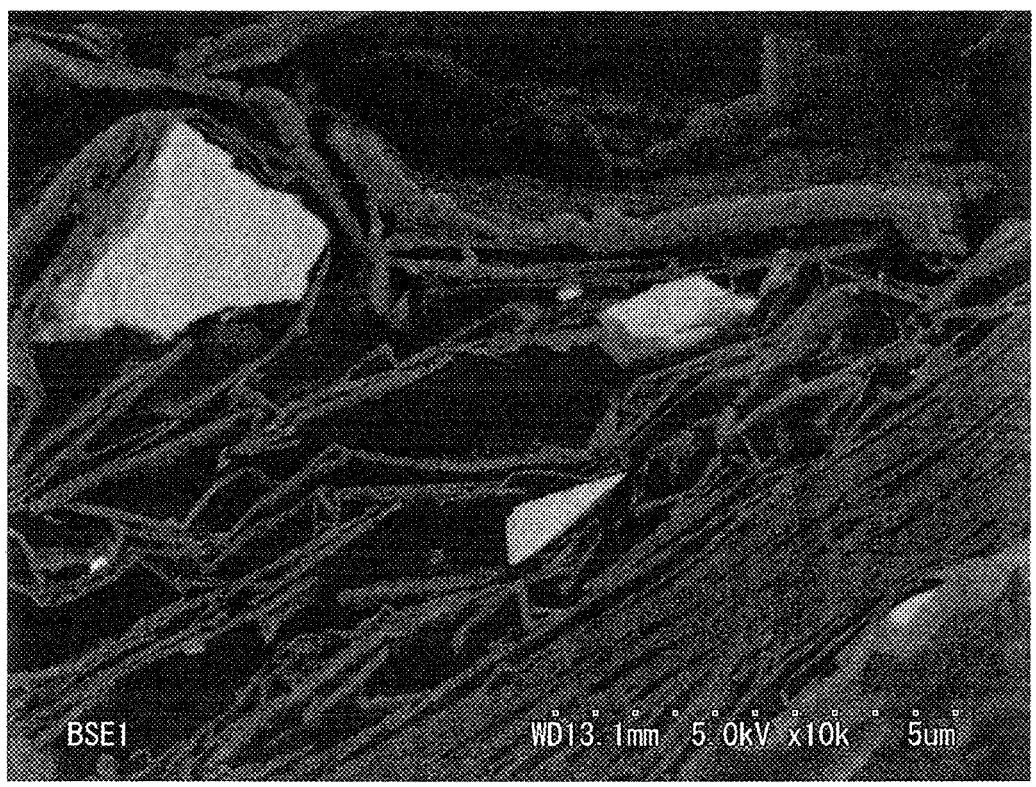

[FIG. 8]
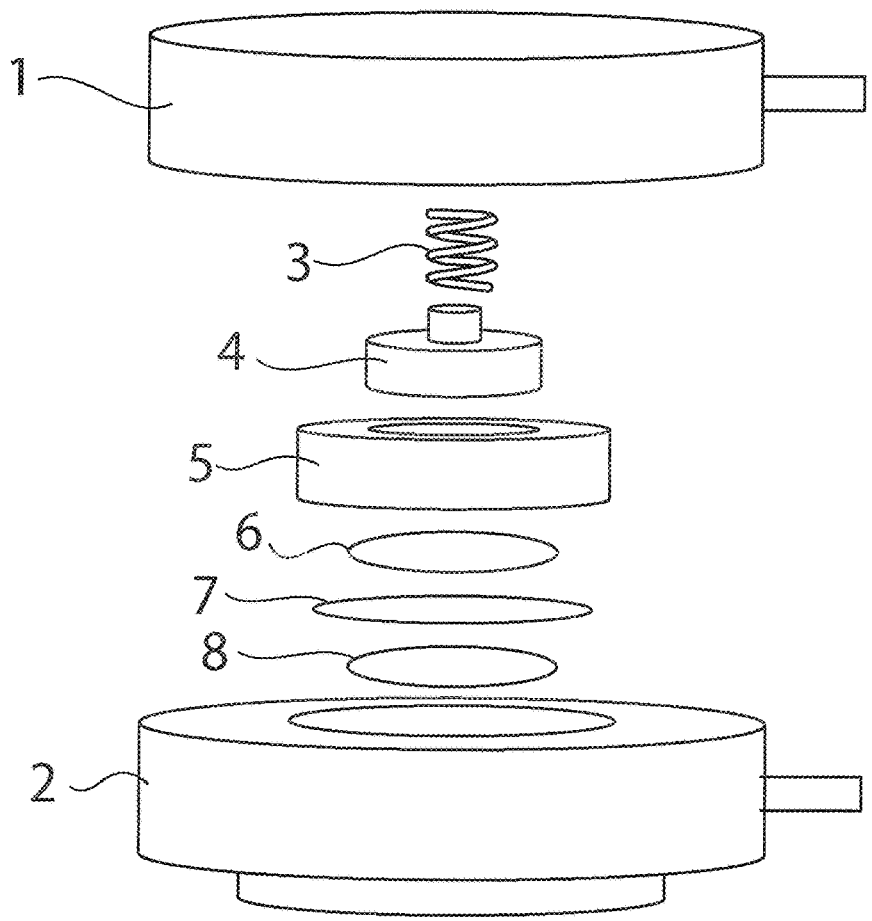
[FIG. 9]
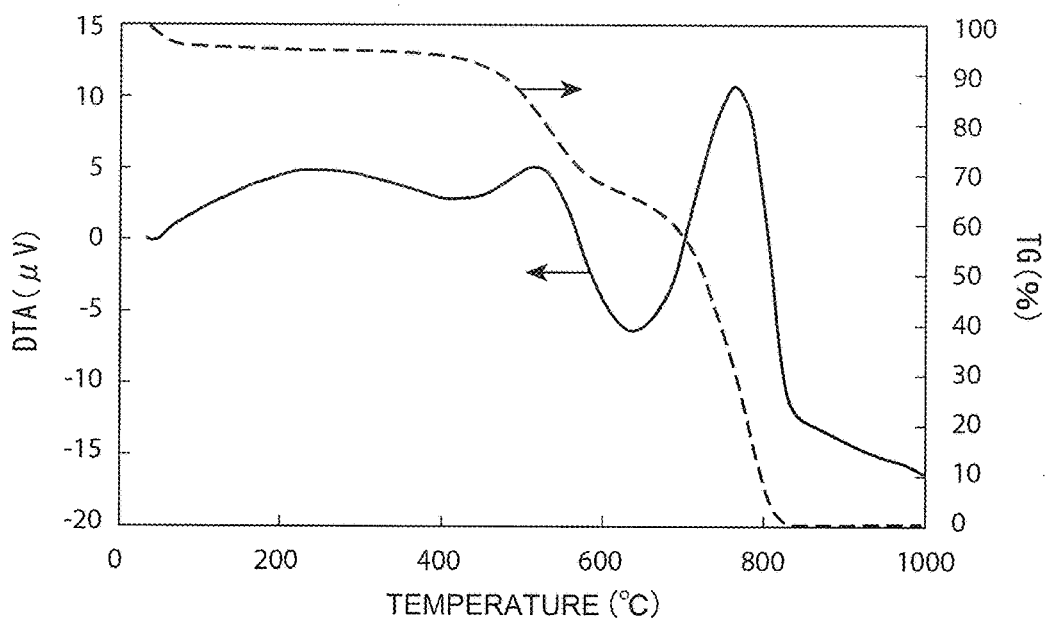

[FIG. 10]
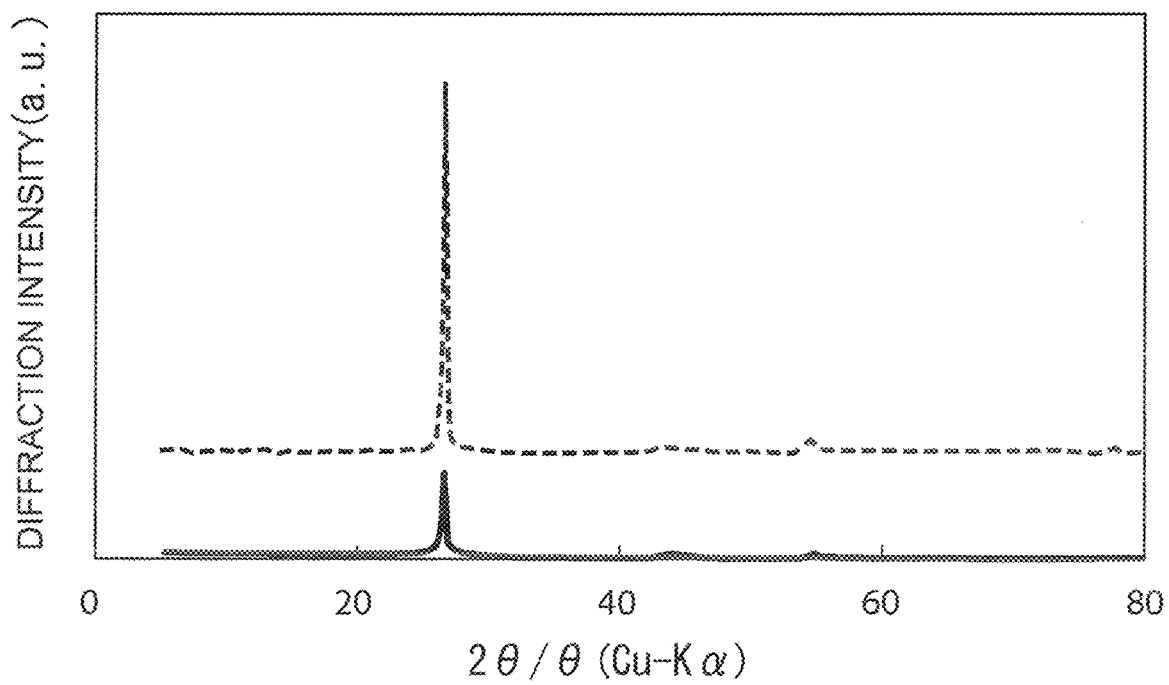
[FIG. 11]
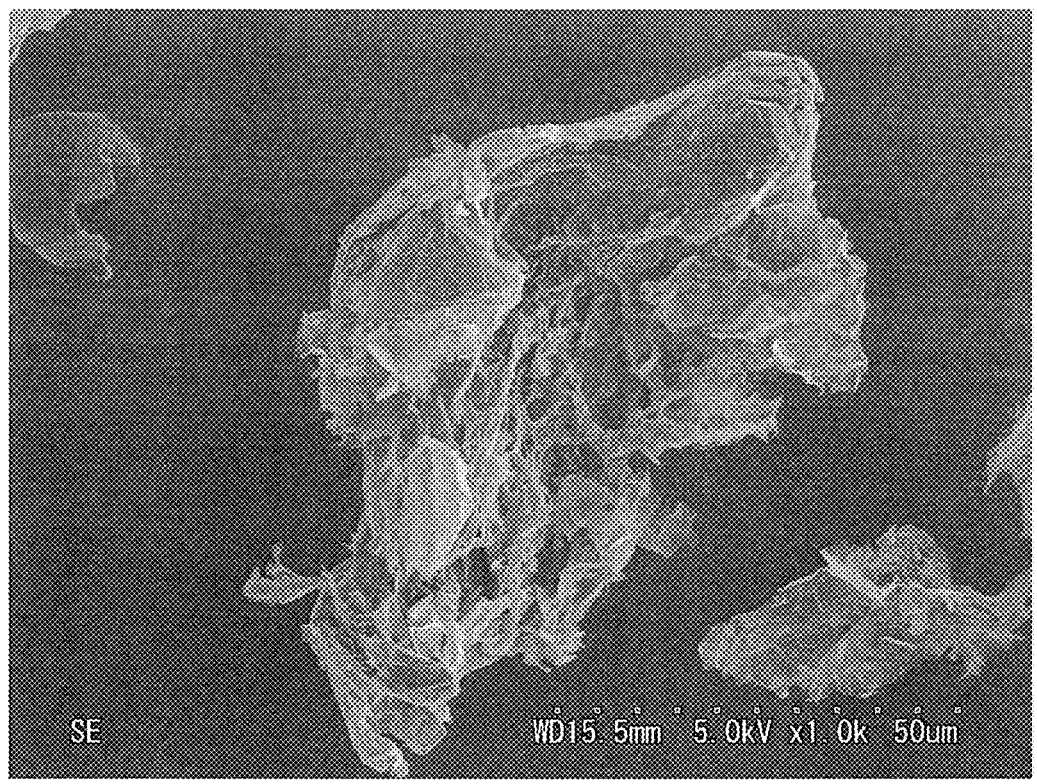

[FIG. 12]
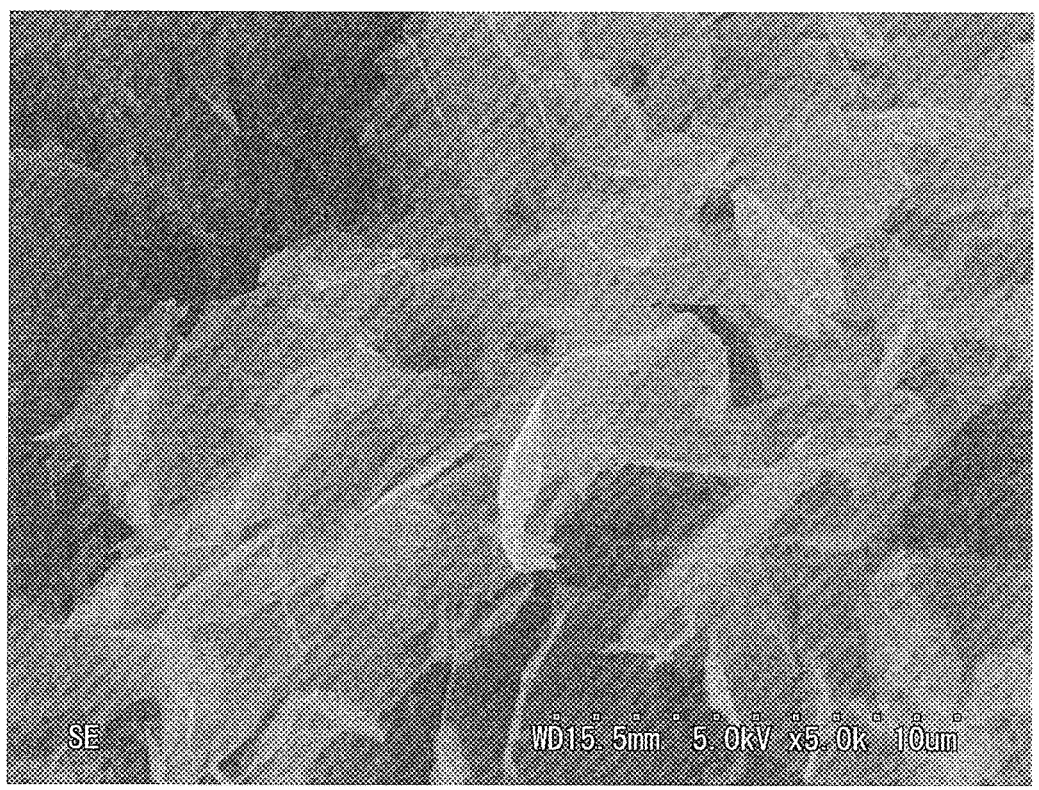
[FIG. 13]
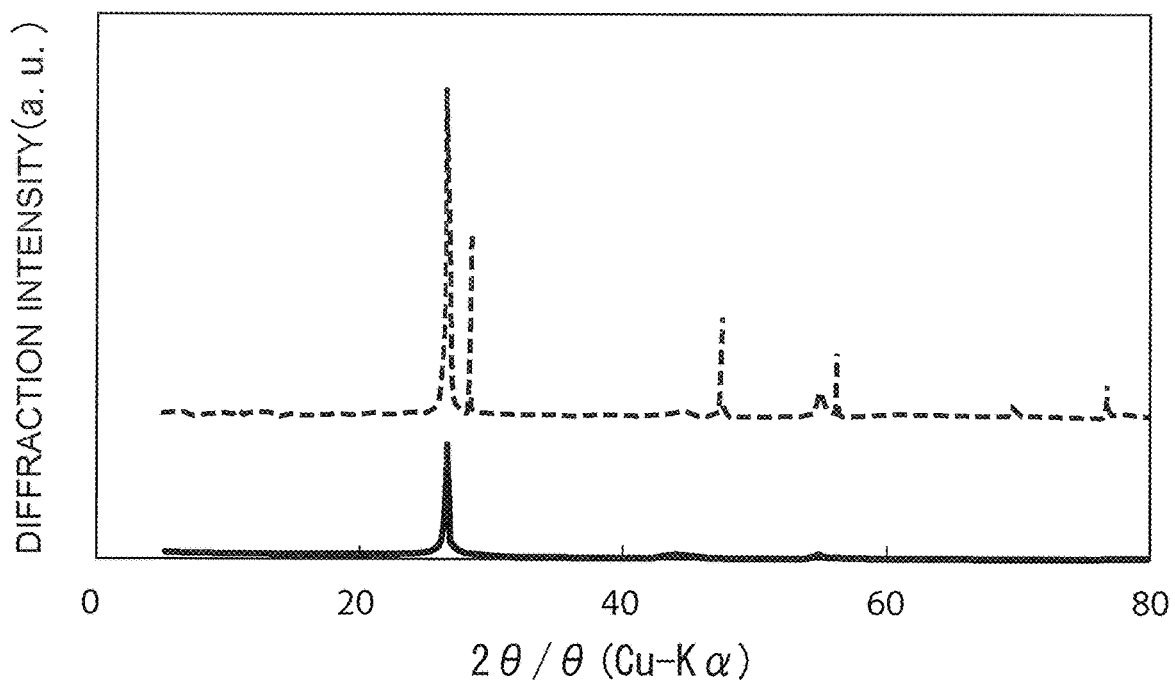

[FIG. 14]
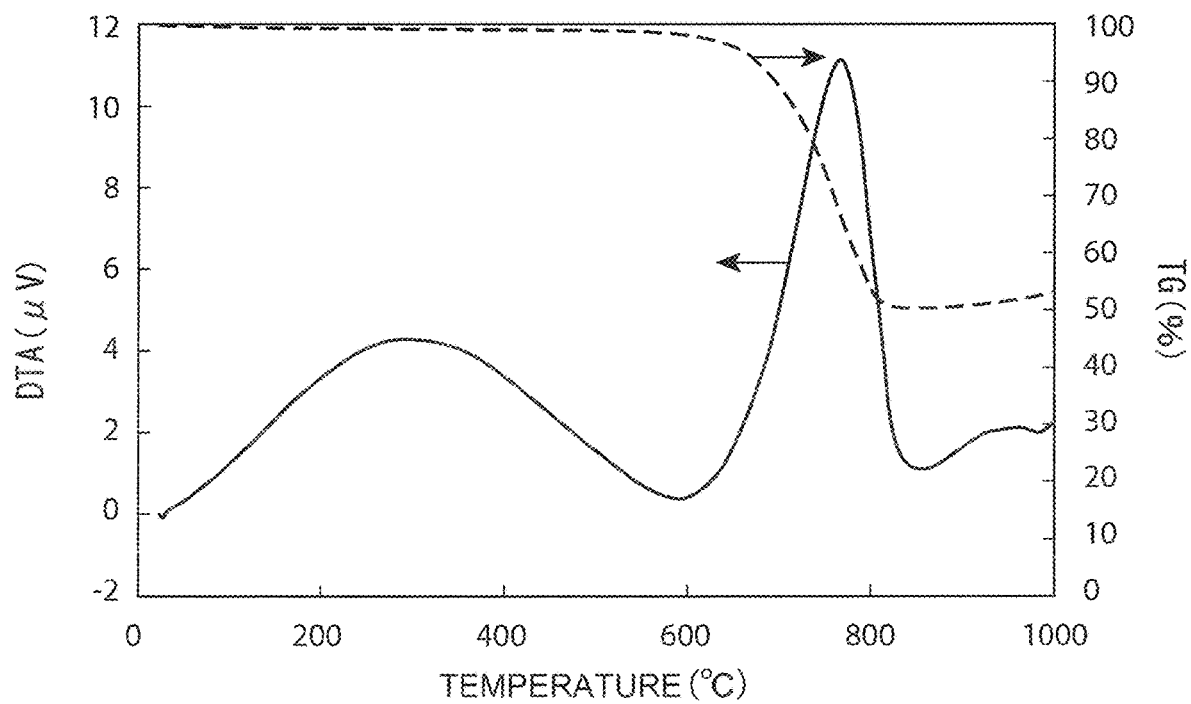
[FIG. 15]
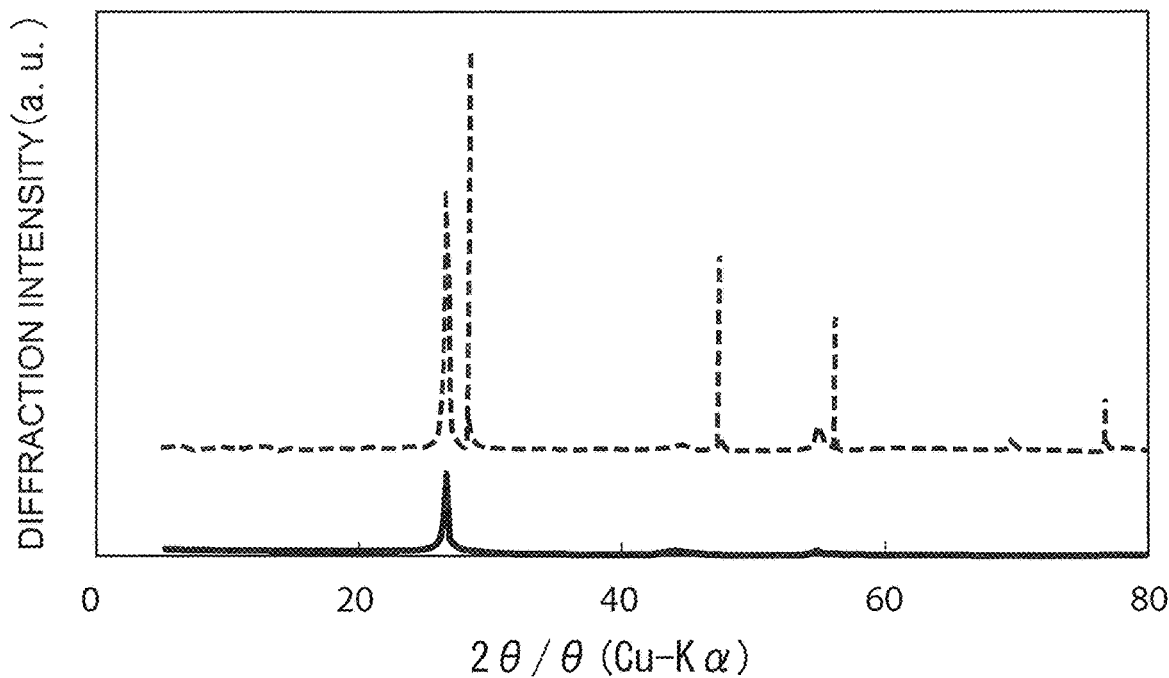

[FIG. 16]
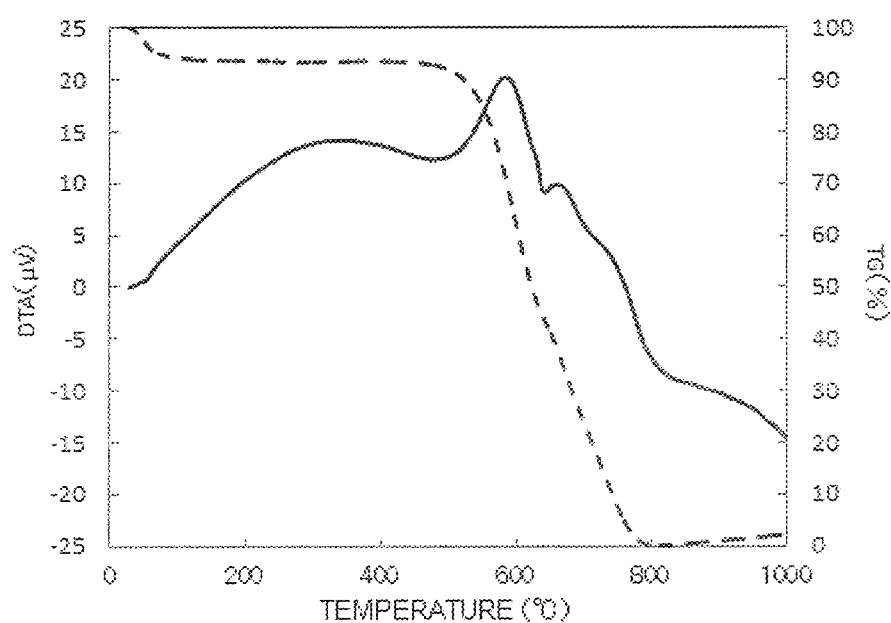

ACTIVE MATERIAL-EXFOLIATED GRAPHITE COMPOSITE, NEGATIVE ELECTRODE MATERIAL FOR LITHIUM ION SECONDARY BATTERY, AND LITHIUM ION SECONDARY BATTERY

TECHNICAL FIELD

The present invention relates to an active material-exfoliated graphite composite, a negative electrode material for lithium ion secondary batteries using the active material-exfoliated graphite composite, and a lithium ion secondary battery using the negative electrode material for lithium ion secondary batteries.

BACKGROUND ART

Conventionally, lithium ion secondary batteries have been widely used because smaller size and larger capacity can be promoted. In the lithium ion secondary battery, lithium is intercalated and deintercalated in the positive electrode and the negative electrode. Therefore, as materials constituting the positive electrode and the negative electrode, that is, active materials, materials capable of intercalating and deintercalating Li are used.

As the negative electrode active materials of lithium ion secondary batteries, carbon materials have conventionally been widely used. However, in recent years, negative electrodes using Si have attracted attention because of higher theoretical capacity than that of carbon. However, the volume of Si changes largely by the intercalation and deintercalation of lithium ions. Therefore, a problem is that the charge and discharge performance decreases during use.

The following Patent Literature 1 discloses a negative electrode material that is a spherical assembly formed by bonding plate-like Si materials, wherein pores are formed inside the assembly, in order to solve such a problem.

CITATION LIST

Patent Literature

Patent Literature 1: Japanese Patent Laid-Open No. 2009-129914

SUMMARY OF INVENTION

Technical Problem

However, in the spherical assembly obtained by bonding plate-like Si as described in Patent Literature 1, the structure has to be complex. Therefore, the production process is complicated.

In addition, even if such a negative electrode material is used, a decrease in which the charge and discharge performance decreases during use cannot be sufficiently suppressed.

It is an object of the present invention to provide an active material-exfoliated graphite composite that allows a lithium ion secondary battery to be obtained in which the initial capacity is large and deterioration in charge and discharge cycle characteristics is less likely to occur, when used for a negative electrode material for lithium ion secondary batteries, and a negative electrode material for lithium ion secondary batteries comprising the active material-exfoliated graphite composite.

It is another object of the present invention to provide a lithium ion secondary battery using the above negative electrode material for lithium ion secondary batteries.

Solution to Problem

An active material-exfoliated graphite composite according to the present invention comprises partially exfoliated graphite having a structure in which graphite is partially exfoliated; and an active material that is in the form of particles capable of intercalating and deintercalating lithium ions by composite formation with the partially exfoliated graphite, or particles capable of adsorbing and desorbing lithium ions by composite formation with the partially exfoliated graphite, and an average particle diameter of the active material is 1 μm or more and 100 μm or less.

In the active material-exfoliated graphite composite according to the present invention, preferably, the active material is included within the partially exfoliated graphite.

In the active material-exfoliated graphite composite according to the present invention, preferably, the active material is in the form of particles of at least one selected from the group consisting of Co, Mn, Ni, P, Sn, Ge, Si, Ti, Zr, V, Al, and compounds thereof, and a compound having a polyacene skeleton. More preferably, the active material is in the form of particles comprising Si or a compound of Si.

In the active material-exfoliated graphite composite according to the present invention, preferably, the content of the active material is 5% by weight or more and 90% by weight or less.

A negative electrode material for lithium ion secondary batteries according to the present invention comprises an active material-exfoliated graphite composite formed according to the present invention and a binder resin.

In the negative electrode material for lithium ion secondary batteries according to the present invention, preferably, the above binder resin is at least one selected from the group consisting of styrene butadiene rubber, carboxymethyl cellulose, polyvinylidene fluoride, a polyimide resin, a (meth)acrylic resin, and an acetal resin.

A lithium ion secondary battery according to the present invention comprises as a negative electrode a negative electrode material for lithium ion secondary batteries formed according to the present invention.

The lithium ion secondary battery according to the present invention preferably comprises the negative electrode comprising the negative electrode material for lithium ion secondary batteries, a positive electrode, and a separator disposed between the negative electrode and the positive electrode.

In the lithium ion secondary battery according to the present invention, preferably, the negative electrode has not any metal foil but comprises the negative electrode material for lithium ion secondary batteries.

In the lithium ion secondary battery according to the present invention, preferably, the negative electrode is formed on one surface of the separator as a coating obtained by providing the negative electrode material for lithium ion secondary batteries on the one surface.

Advantageous Effect of Invention

According to the present invention, it is possible to provide an active material-exfoliated graphite composite that allows a lithium ion secondary battery to be obtained in which the initial capacity is large and deterioration in charge and discharge cycle characteristics is less likely to occur, when used for a negative electrode material for lithium ion secondary batteries.

BRIEF DESCRIPTION OF DRAWINGS

FIG. 1 is a diagram showing the TG/DTA measurement results of resin-retained partially exfoliated graphite obtained in Example 1.

FIG. 2 is a diagram showing the XRD spectrum of the resin-retained partially exfoliated graphite obtained in Example 1.

FIG. 3 is a diagram showing a scanning electron micrograph at 1000× magnification of the resin-retained partially exfoliated graphite obtained in Example 1.

FIG. 4 is a diagram showing a scanning electron micrograph at 5000× magnification of the resin-retained partially exfoliated graphite obtained in Example 1.

FIG. 5 is a diagram showing the XRD spectrum of an active material-exfoliated graphite composite obtained in Example 1.

FIG. 6 shows a scanning electron micrograph at 5000× magnification of the active material-exfoliated graphite composite obtained in Example 1.

FIG. 7 shows a scanning electron micrograph at 10000× magnification of a cross section of a negative electrode material for lithium ion secondary batteries obtained in Example 1.

FIG. 8 is an exploded perspective view showing the schematic configuration of a half cell made for electrical characteristic evaluation.

FIG. 9 is a diagram showing the TG/DTA measurement results of resin-retained partially exfoliated graphite obtained in Example 2.

FIG. 10 is a diagram showing the XRD spectrum of the resin-retained partially exfoliated graphite obtained in Example 2.

FIG. 11 is a diagram showing a scanning electron micrograph at 1000× magnification of the resin-retained partially exfoliated graphite obtained in Example 2.

FIG. 12 is a diagram showing a scanning electron micrograph at 5000× magnification of the resin-retained partially exfoliated graphite obtained in Example 2.

FIG. 13 is a diagram showing the XRD spectrum of an active material-exfoliated graphite composite obtained in Example 2.

FIG. 14 is a diagram showing the TG/DTA measurement results of an active material-exfoliated graphite composite obtained in Example 3.

FIG. 15 is a diagram showing the XRD spectrum of the active material-exfoliated graphite composite obtained in Example 3.

FIG. 16 is a diagram showing the TG/DTA measurement results of an active material-exfoliated graphite composite obtained in Example 4.

DESCRIPTION OF EMBODIMENTS

The details of the present invention will be described below.

(Active Material-Exfoliated Graphite Composite)

An active material-exfoliated graphite composite according to the present invention comprises partially exfoliated graphite and an active material. The above partially exfoliated graphite has a structure in which graphite is partially exfoliated. The above active material is in the form of particles capable of intercalating and deintercalating lithium ions by composite formation with partially exfoliated graphite. Alternatively, the above active material is in the form of particles capable of adsorbing and desorbing lithium ions by composite formation with partially exfoliated graphite.

In other words, the active material-exfoliated graphite composite according to the present invention is a composite formed from partially exfoliated graphite and an active material that is in the form of particles capable of intercalating and deintercalating lithium ions by composite formation with partially exfoliated graphite, or particles capable of adsorbing and desorbing lithium ions by composite formation with partially exfoliated graphite.

Therefore, when the active material-exfoliated graphite composite according to the present invention is used for a negative electrode material for lithium ion secondary batteries as described later, deterioration in charge and discharge cycle characteristics is less likely to occur.

The above active material is preferably included within the above partially exfoliated graphite. In this case, deterioration in charge and discharge cycle characteristics is much less likely to occur. In addition, when the above active material is included within the above partially exfoliated graphite, the conductivity in the thickness direction can be increased much more compared with conventional graphite.

In the present invention, the average particle diameter of the above active material is relatively large, 1 µm or more and 100 µm or less. Therefore, when the active material-exfoliated graphite composite according to the present invention is used for a negative electrode material for lithium ion secondary batteries, the initial capacity can be increased. In addition, the active material is more easily handled and also better in safety than fine particles of nanosize and the like.

As used herein, the average particle diameter refers to a value calculated from volume-based distribution by a laser diffraction method. One example of average particle diameter measurement used in the present Examples described later below is given.

In the present Examples described later, a laser diffraction/scattering particle size distribution analyzer, LA950 (manufactured by HORIBA, Ltd.) was used. For a reference refractive index, the refractive index of a methyl methacrylate resin (1.49) was used. Water was used as a solvent, and an active material suspension was added so that the transmittance was 80% or more, and measurement was performed with a circulation rate of 7 in 15 grades, a stirring rate of 7 in 15 grades, an ultrasonic intensity of 7 in 7 grades, and an ultrasonic treatment time of 1 to 3 minutes.

Here, the solvent can be appropriately changed into such as water or ethanol, and the stirring method can be appropriately adjusted. When the above average particle diameter is measured from a material such as a lithium ion secondary battery negative electrode material, any 20 particles observed in the material using an electron microscope such as an SEM are selected, and the average particle diameter can be calculated as the average value of particle diameters obtained from the average values of major axes and minor axes.

Materials constituting the active material-exfoliated graphite composite of the present invention will be described in more detail below.

Partially Exfoliated Graphite;

In the partially exfoliated graphite, the distance between graphene layers in graphite or primary exfoliated graphite is increased by the pyrolysis of a resin described in one example of a production method described later, and thus the graphite is partially exfoliated. More specifically, in the partially exfoliated graphite, graphite is partially exfoliated from the edge to some depth of the inside.

The partially exfoliated graphite has a large number of portions in which graphite is exfoliated. More specifically, the portion in which graphite is exfoliated refers to a portion in which some of graphene stacks or graphene layers in graphite or primary exfoliated graphite is partially exfoliated.

The partially exfoliated graphite has a structure in which graphene sheets are stacked in the middle part as in the original graphite or primary exfoliated graphite. However, portions in which the distance between graphene layers is made larger than in the original graphite or primary exfoliated graphite by the pyrolysis of part of the resin may also be present in the above middle part.

The above graphite is a stack of a plurality of graphene sheets. As the graphite, natural graphite, synthetic graphite, expanded graphite, or the like can be used. The distance between graphene layers is larger in expanded graphite than in common graphite. Therefore, the expanded graphite can be easily exfoliated. When expanded graphite is used, exfoliated graphite can be obtained much more easily.

In the partially exfoliated graphite, the interlayer distance between graphene layers is increased, and also the number of stacked layers of graphene in the edge part, that is, the exfoliated part, is smaller, and therefore, the BET specific surface area is larger.

In the present invention, as the raw material, primary exfoliated graphite may be used instead of graphite. The primary exfoliated graphite includes a lot of exfoliated graphite obtained by exfoliating graphite. The primary exfoliated graphite is obtained by exfoliating graphite, and therefore, its specific surface area may be larger than that of graphite.

In the partially exfoliated graphite, the interlayer distance between graphene layers is increased, and the specific surface area is larger. Further, the above partially exfoliated graphite according to the present invention has a graphite structure in the central part and has an exfoliated structure in the edge part. Therefore, the partially exfoliated graphite is more easily handled than conventional exfoliated graphite.

The above partially exfoliated graphite is obtained by forming a composite of resin-retained partially exfoliated graphite with an active material and then firing the composite to remove the resin, as shown in one example of a production method described later. Part of the resin used in the above pyrolysis may remain, but all of the resin may be removed.

Examples of the resin used in the pyrolysis include polypropylene glycol, polyglycidyl methacrylate, polyvinyl acetate, polytetramethylene ether glycol, polystyrene, polyethylene glycol, polybutyral, or polyacrylic acid. Preferred examples include polypropylene glycol, polyethyl acetate, or polyglycidyl methacrylate. When polypropylene glycol, polyethyl acetate, or polyglycidyl methacrylate is used, the specific surface area of the partially exfoliated graphite can be increased much more.

The amount of the above remaining resin is preferably 20 parts by weight or less, more preferably 10 parts by weight or less, further preferably 5 parts by weight, and particularly preferably 1 part by weight or less based on 100 parts by weight of the partially exfoliated graphite. By setting the amount of the remaining resin at the above upper limit or less, the resistance decreases and a much better electrode can be provided when the partially exfoliated graphite is used in an electrode.

On the other hand, when the resin used in the pyrolysis remains, the specific surface area increases much more compared with the specific surface area of the original graphite. In addition, since the resin remains, the dispersibility in a binder resin improves, and the processability improves.

(Active Material)

The above active material is in the form of particles capable of intercalating and deintercalating lithium ions by composite formation with partially exfoliated graphite. Alternatively, the above active material is in the form of particles capable of adsorbing and desorbing lithium ions by composite formation with partially exfoliated graphite. The above active material is preferably included within the partially exfoliated graphite. In this case, deterioration in charge and discharge cycle characteristics can be suppressed much more.

The material constituting the active material is not particularly limited as long as it is a material capable of intercalating and deintercalating or adsorbing and desorbing lithium ions. For example, lithium transition metal oxides (of Co, Mn, Ni, P, or combinations thereof), and Sn, Ge, Si, Ti, Zr, V, Al, or compounds thereof, and compounds having a polyacene skeleton can be used. These may be used alone, or a plurality of these may be used in combination. As the above compounds thereof, for example, oxides such as SiO and $SiO_2$ can be used in the case of Si, and oxides such as $TiO_2$ can be used in the case of Ti. As the above compounds having a polyacene skeleton, those having a structure in which a plurality of aromatic rings are condensed linearly or in a planar form are preferred. Examples thereof can include insoluble and infusible substrates having a polyacene skeleton structure described in Japanese Patent Publication No. 1-44212, Japanese Patent Publication No. 3-24024, WO95/08852, and the like.

The average particle diameter of the above active material is 1 μm or more and 100 μm or less. From the viewpoint of increasing initial capacity much more, the average particle diameter of the above active material is preferably 1 μm or more and 50 μm or less, more preferably 5 μm or more and 25 μm or less.

The content of particles having an average particle diameter of 1 μm or less is preferably 50% or less, more preferably 30% or less, and further preferably 20% or less.

From the viewpoint of increasing initial capacity much more and suppressing deterioration in charge and discharge characteristics much more, the content of the above active material in the active material-exfoliated graphite composite is preferably 5% by weight or more and 90% by weight or less, more preferably 15% by weight or more and 80% by weight or less, and further preferably 20% by weight or more and 70% by weight or less. The shape of the above active material is not limited to a spherical shape and may be such a shape as a mass is ground.

(Method for Producing Active Material-Exfoliated Graphite Composite)

One example of a method for producing the active material-exfoliated graphite composite according to the present invention will be described below. The active material-exfoliated graphite composite according to the present invention may be produced by other methods.

One example of a method for producing the active material-exfoliated graphite composite according to the present invention comprises the steps of (1) obtaining resin-retained partially exfoliated graphite; and (2) heating a raw material composition comprising the above resin-retained partially exfoliated graphite and an active material to fire and remove the resin and form a composite from the partially exfoliated graphite and the active material to obtain an active material-exfoliated graphite composite.

(1) Step of Obtaining Resin-Retained Partially Exfoliated Graphite

The resin-retained partially exfoliated graphite is a composite material comprising a portion in which the interlayer distance between graphene layers is increased, and a portion in which graphene layers are bonded by a remaining resin.

Such resin-retained partially exfoliated graphite can be obtained by a production method comprising the steps of providing a raw material composition comprising graphite or primary exfoliated graphite and a resin, the resin being fixed to the above graphite or primary exfoliated graphite; and pyrolyzing the resin contained in the above raw material composition to exfoliate the graphite or primary exfoliated graphite while allowing part of the resin to remain. For example, the resin-retained partially exfoliated graphite can be produced by a method similar to a method for producing an exfoliated graphite-resin composite material described in International Publication No. WO 2014/34156.

Graphite is a stack of a plurality of graphene layers. Examples of the graphite include natural graphite, synthetic graphite, and expanded graphite. As the graphite used as a raw material, expanded graphite is preferred. The distance between graphene layers is larger in expanded graphite than in usual graphite, and therefore, the expanded graphite can be easily exfoliated. Therefore, by using expanded graphite as the raw material graphite, the resin-retained partially exfoliated graphite can be easily produced.

In the above graphite, the number of stacked layers of graphene is about 100000 to 1000000, and the above graphite has a value of 35 $m^2/g$ or less in terms of BET specific surface area.

On the other hand, in the resin-retained partially exfoliated graphite, the number of stacked layers of graphene in the above exfoliated portion is small. The number of stacked layers of graphene in the above exfoliated portion is preferably 3000 or less, more preferably 1000 or less, further preferably 300 or less, and particularly preferably 100 or less. When the number of stacked layers of graphene in the above exfoliated portion is small, an active material is included within much more easily, and the battery characteristics can be improved.

In addition, in the resin-retained partially exfoliated graphite, the interlayer distance between graphene layers is increased, and moreover, the number of stacked layers of graphene in the edge part, that is, the exfoliated portion, is small, and therefore, the BET specific surface area is large.

The BET specific surface area of the resin-retained partially exfoliated graphite is preferably 40 $m^2/g$ or more, more preferably 60 $m^2/g$ or more, and further preferably 100 $m^2/g$ or more. The BET specific surface area of the resin-retained partially exfoliated graphite is preferably 2500 $m^2/g$ or less. When the BET specific surface area is in the above range, an active material is included within much more easily, and the battery characteristics can be improved much more.

As the raw material, primary exfoliated graphite may be used instead of graphite. The primary exfoliated graphite widely includes, in addition to exfoliated graphite obtained by exfoliating graphite, and resin-retained exfoliated graphite, conventionally known exfoliated graphite. The primary exfoliated graphite is obtained by exfoliating graphite, and therefore, its specific surface area may be larger than that of graphite.

The resin contained in the above resin-retained partially exfoliated graphite is not particularly limited and is preferably a polymer of a radical polymerizable monomer. In this case, the resin may be a homopolymer of one radical polymerizable monomer or a copolymer of a plurality of radical polymerizable monomers. The above radical polymerizable monomer is not particularly limited as long as it is a monomer having a radical polymerizable functional group.

Examples of the above radical polymerizable monomer include styrene, methyl α-ethylacrylate, methyl α-benzylacrylate, methyl α-[2,2-bis(carbomethoxy)ethyl]acrylate, dibutyl itaconate, dimethyl itaconate, dicyclohexyl itaconate, α-methylene-δ-valerolactone, α-methylstyrene, α-substituted acrylates comprising α-acetoxystyrene, vinyl monomers having a glycidyl group or a hydroxyl group such as glycidyl methacrylate, 3,4-epoxycyclohexylmethyl methacrylate, hydroxyethyl methacrylate, hydroxyethyl acrylate, hydroxypropyl acrylate, and 4-hydroxybutyl methacrylate; vinyl monomers having an amino group such as allylamine, diethylaminoethyl (meth)acrylate, and dimethylaminoethyl (meth)acrylate; monomers having a carboxyl group such as methacrylic acid, maleic anhydride, maleic acid, itaconic acid, acrylic acid, crotonic acid, 2-acryloyloxyethyl succinate, 2-methacryloyloxyethyl succinate, and 2-methacryloyloxyethylphthalic acid; monomers having a phosphate group such as Phosmer M, Phosmer CL, Phosmer PE, Phosmer MH, and Phosmer PP manufactured by Uni-Chemical Co., Ltd.; monomers having an alkoxysilyl group such as vinyltrimethoxysilane and 3-methacryloxypropyltrimethoxysilane; and (meth)acrylate monomers having an alkyl group, a benzyl group, or the like.

As the resin contained in the above resin-retained partially exfoliated graphite, polypropylene glycol, styrene polymers, vinyl acetate polymers, polytetramethylene ether glycol, polystyrene, polyethylene glycol, polyglycidyl methacrylate, or butyral resins are more preferably used.

The reason is that it is necessary to remove the remaining resin by firing in the step of forming a composite from an active material and the partially exfoliated graphite described later, and therefore, it is desired that the decomposition temperature of the remaining resin is lower than that of the partially exfoliated graphite.

The content of the resin in the above resin-retained partially exfoliated graphite is preferably 5% by mass to 75% by mass. The content is more preferably 10% by mass to 70% by mass, further preferably 10% by mass to 40% by mass.

When the content of the resin is too low, the handling properties decrease and an active material cannot be sufficiently inserted between the graphene layers in some cases. When the content of the resin is too high, a sufficient amount of active material cannot be inserted between the graphene layers in some cases.

In the present invention, the pyrolysis initiation temperature and pyrolysis end temperature of the resin in the resin-retained partially exfoliated graphite are higher than the pyrolysis initiation temperature and pyrolysis end temperature of the resin before composite formation, respectively. In the present invention, the pyrolysis initiation temperature and pyrolysis end temperature refer to TGA measurement-dependent decomposition initiation temperature and decomposition end point temperature, respectively.

The graphene is not oxidized in the above resin-retained partially exfoliated graphite. Therefore, excellent conductivity is developed. In addition, since the graphene is not oxidized, complicated reduction treatment at high temperature and in the presence of an inert gas is not required.

Another feature of the resin-retained exfoliated graphite is that it is relatively less likely to scatter.

This is considered to be because a polymer obtained by polymerizing the above radical polymerizable monomer is not completely decomposed and remains in the pyrolysis step as described later. In other words, it is considered that the polymer positioned in portions sandwiched between the graphene layers is sandwiched between the graphene layers on both sides and therefore does not completely decompose around the pyrolysis temperature. Therefore, the resin-retained partially exfoliated graphite is easily handled.

In addition, in the resin-retained partially exfoliated graphite, the interlayer distance between graphene layers is increased, and its specific surface area is large. Further, the resin-retained partially exfoliated graphite has a graphite structure in the central portion and has an exfoliated structure in the edge portion. Therefore, the resin-retained partially exfoliated graphite is more easily handled than conventional exfoliated graphite.

Further, the resin-retained partially exfoliated graphite comprises a resin and therefore has high dispersibility in other resins. Particularly, when other resins are resins having a high affinity for the resin contained in the resin-retained partially exfoliated graphite, the dispersibility of the resin-retained partially exfoliated graphite in the other resins is higher.

In the production of the above resin-retained partially exfoliated graphite, first, a composition comprising graphite or primary exfoliated graphite and the above resin, the above resin being fixed to the above graphite or the above primary exfoliated graphite, is provided.

As the step of providing this composition, for example, the following first and second methods in which a polymer is grafted on graphite or primary exfoliated graphite to fix the polymer to the graphite or primary exfoliated graphite, and the following third method in which a polymer is adsorbed on graphite or primary exfoliated graphite to fix the polymer to the graphite or primary exfoliated graphite can be used.

First Method;

In the first method, first, a mixture comprising the above graphite or primary exfoliated graphite and the above radical polymerizable monomer is provided as a raw material. Next, the radical polymerizable monomer contained in the mixture is polymerized to form a polymer in which the above radical polymerizable monomer is polymerized in the mixture and to graft the polymer on the graphite or primary exfoliated graphite.

In the first method, first, a composition comprising the graphite or primary exfoliated graphite and the radical polymerizable monomer is provided.

The blending ratio between the graphite and the radical polymerizable monomer is not particularly limited and is desirably a ratio of 1:1 to 1:100 in terms of a mass ratio. By setting the blending ratio in the above range, it is possible to exfoliate the graphite or primary exfoliated graphite effectively to obtain the resin-retained partially exfoliated graphite much more effectively.

In the step of providing the above composition, preferably, a composition further comprising a pyrolyzable foaming agent that generates a gas in pyrolysis is provided. In this case, the graphite or primary exfoliated graphite can be exfoliated much more effectively by heating described later.

The above pyrolyzable foaming agent is not particularly limited as long as it is a compound that decomposes spontaneously by heating and generates a gas during the decomposition. As the above pyrolyzable foaming agent, a foaming agent that generates nitrogen gas during decomposition, for example, an azocarboxylic acid, diazoacetamide, azonitrile compound, benzenesulfohydrazine, or nitroso compound, or a foaming agent that generates carbon monoxide, carbon dioxide, methane, aldehyde, or the like during decomposition can be used. The above pyrolyzable foaming agent may be used alone, or a plurality of foaming agents may be used in combination.

Preferably, as the above pyrolyzable foaming agent, azodicarbonamide (ADCA) having a structure represented by the following formula (1) and foaming agents having structures represented by the following formulas (2) to (4) can be used. These foaming agents decompose spontaneously by heating and generate a nitrogen gas during the decomposition.

[Formula 1]

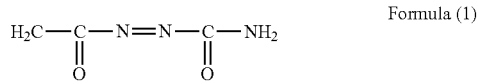

Formula (1)

[Formula 2]

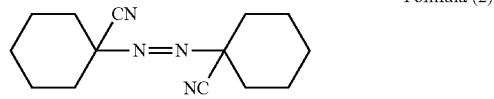

Formula (2)

[Formula 3]

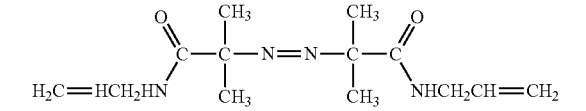

Formula (3)

[Formula 4]

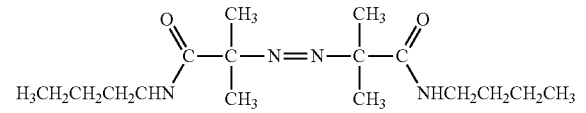

Formula (4)

The pyrolysis temperature of the above pyrolyzable foaming agent is not particularly limited and may be lower or higher than a temperature at which the above radical polymerizable monomer spontaneously initiates polymerization. For example, the pyrolysis temperature of the ADCA having the structure represented by the above formula (1) is 210° C., which is a temperature higher than a temperature at which styrene spontaneously initiates polymerization, 150° C., when the above radical polymerizable monomer is styrene. The pyrolysis initiation temperatures of pyrolyzable foaming agents having the structures represented by the above formulas (2) to (4) are 88° C., 96° C., and 110° C. in order, and these are temperatures lower than the temperature at which styrene spontaneously initiates polymerization, 150° C.

The blending ratio between the above graphite or primary exfoliated graphite and the above pyrolyzable foaming agent is not particularly limited, and 100 parts by weight to 300 parts by weight of the above pyrolyzable foaming agent is preferably blended based on 100 parts by weight of the above graphite or primary exfoliated graphite. By setting the amount of the above pyrolyzable foaming agent blended in the above range, it is possible to exfoliate the above graphite or primary exfoliated graphite much more effectively to obtain the resin-retained partially exfoliated graphite effectively.

The method for providing the above composition is not particularly limited. Examples of the method include a method of dispersing the above graphite or primary exfoliated graphite in the above radical polymerizable monomer using the above radical polymerizable monomer as a dispersion medium. In addition, the above composition further comprising the above pyrolyzable foaming agent can be provided by dissolving or dispersing the above pyrolyzable foaming agent in the above radical polymerizable monomer.

Next, the step of polymerizing the above radical polymerizable monomer contained in the above composition to form a polymer in which the above radical polymerizable monomer is polymerized in the above composition is performed.

At this time, the above radical polymerizable monomer forms a free radical, and thus, the above radical polymerizable monomer undergoes radical polymerization, and thus, the polymer in which the above radical polymerizable monomer is polymerized is formed.

On the other hand, the graphite contained in the above composition is a stack of a plurality of graphene layers and therefore has radical trapping properties. Therefore, when the above radical polymerizable monomer is subjected to polymerization in the above composition comprising the above graphite or primary exfoliated graphite, the above free radical is adsorbed on the ends and surfaces of the graphene layers of the above graphite or primary exfoliated graphite.

Therefore, the above polymer or the above radical polymerizable monomer having the above free radical formed during the polymerization is grafted on the ends and surfaces of the graphene layers of the above graphite or primary exfoliated graphite.

Examples of the method for polymerizing the above radical polymerizable monomer contained in the above composition include a method of heating the above composition to the temperature at which the above radical polymerizable monomer spontaneously initiates polymerization or higher. By heating the above composition to the above temperature or higher, a free radical can be formed in the above radical polymerizable monomer contained in the above composition. Thus, the above-described polymerization and grafting can be performed.

When the above radical polymerizable monomer is polymerized by heating as described above, both the polymerization of the above radical polymerizable monomer and the pyrolysis of the above polymer described later can be performed by simply heating the above composition. Therefore, the exfoliation of the graphite or primary exfoliated graphite is much easier.

The above heating method is not particularly limited as long as it is a method that can heat the above composition to the above temperature or higher. The above composition can be heated by an appropriate method and apparatus. In the above heating, heating may be performed without sealing, that is, under normal pressure.

In order to reliably polymerize the above radical polymerizable monomer, after the above composition is heated to a temperature equal to or higher than the temperature at which the above radical polymerizable monomer spontaneously initiates polymerization, the above temperature may be further maintained for a certain time. The time that the above composition is maintained around the above temperature is preferably in the range of 0.5 to 5 hours though depending on the type and amount of the radical polymerizable monomer used.

After the step of forming the above polymer, the step of heating the above composition to the pyrolysis temperature of the above polymer to pyrolyze the above polymer while allowing part of the polymer to remain is performed. Thus, the above polymer contained in the above composition, the above polymer grafted on the ends and surfaces of the graphene layers of the above graphite or primary exfoliated graphite, and the like are pyrolyzed. In the present invention, the pyrolysis temperature of the above polymer refers to TGA measurement-dependent decomposition end point temperature. For example, when the polymer is polystyrene, the pyrolysis temperature of the above polymer is about 350° C.

At this time, when the above polymer grafted on the ends and surfaces of the graphene layers of the above graphite or primary exfoliated graphite, and the like are pyrolyzed, exfoliation force occurs between the above graphene layers. Therefore, by pyrolyzing the above polymer and the like, that is, resin, the above graphite or primary exfoliated graphite can be exfoliated between the graphene layers of the above graphite or primary exfoliated graphite to obtain the resin-retained partially exfoliated graphite.

Part of the polymer remains in the composition even through this pyrolysis. The pyrolysis initiation temperature and pyrolysis end temperature of the resin in the resin-retained partially exfoliated graphite obtained by the pyrolysis are higher than the pyrolysis initiation temperature and pyrolysis end temperature of the resin before composite formation, respectively.

In the present invention, the exfoliated graphite is a graphene stack after exfoliation obtained by subjecting the original graphite or primary exfoliated graphite to exfoliation treatment, and refers to a graphene stack having a larger specific surface area than the original graphite or primary exfoliated graphite, or a graphene stack in which the decomposition end point of the original graphite or primary exfoliated graphite shifts to lower temperature.

The above heating method is not particularly limited as long as it is a method that can heat the above composition to the pyrolysis temperature of the above polymer. The above composition can be heated by an appropriate method and apparatus. In the above heating, heating may be performed without sealing, that is, under normal pressure. Therefore, the exfoliated graphite can be produced inexpensively and easily. Pyrolysis such that the resin is allowed to remain can be achieved by adjusting the heating time. In other words, by shortening the heating time, the amount of the remaining resin can be increased. By lowering the heating temperature, the amount of the remaining resin can also be increased.

Also in the second method and the third method described later, in the step of heating the above composition so as to allow part of the polymer to remain, the heating temperature and the heating time may be adjusted.

After the above composition is heated to a temperature equal to or higher than the pyrolysis temperature of the above polymer, the above temperature may be further maintained for a certain time, when the above polymer can be pyrolyzed so that part of the polymer remains, while part of the polymer is allowed to remain in the composition. The time that the above composition is maintained around the above temperature is preferably in the range of 0.2 to 5 hours though depending on the type and amount of the radical polymerizable monomer used.

When the above radical polymerizable monomer is polymerized by heating in the step of forming the above polymer, heat treatment in the step of forming the above polymer, and heat treatment in the step of pyrolyzing the above polymer described later may be continuously performed by the same method and apparatus.

In the above heating, in a case where the above composition further comprises a pyrolyzable foaming agent, when the above composition is heated to the pyrolysis temperature of the above pyrolyzable foaming agent, the above pyrolyzable foaming agent is pyrolyzed in the above composition. On the other hand, the above pyrolyzable foaming agent generates a gas and foams during pyrolysis.

At this time, when the above pyrolyzable foaming agent is pyrolyzed in the vicinity of the graphene layers of the above graphite or primary exfoliated graphite, the above gas generated by the above pyrolysis enters between the above graphene layers, and the spacing between the above graphene layers is increased. Thus, exfoliation force occurs between the above graphene layers, and therefore, the above graphite or primary exfoliated graphite can be further exfoliated. Therefore, by using the above pyrolyzable foaming agent, the specific surface area of the obtained exfoliated graphite can be increased much more.

By using the above radical polymerizable monomer and/or the above polymer and the above pyrolyzable foaming agent in combination, the graphite or primary exfoliated graphite can be exfoliated much more effectively. The reason why the graphite or primary exfoliated graphite can be exfoliated much more effectively by such a method is not certain, but the following reason is considered.

As described above, when the above radical polymerizable monomer forms a free radical, the above polymer or the above radical polymerizable monomer having the above free radical formed during polymerization is grafted on the ends and surfaces of the graphene layers of the above graphite or primary exfoliated graphite. Therefore, the above free radical is trapped in the graphene layers of the above graphite or primary exfoliated graphite. On the other hand, the above pyrolyzable foaming agent has the property of high affinity for radicals and therefore is attracted to the free radical trapped in the graphene layers of the above graphite or primary exfoliated graphite in the above composition. Therefore, the above pyrolyzable foaming agent is easily pyrolyzed in the vicinity of the stacked surfaces of the graphene sheets of the graphite or primary exfoliated graphite. Therefore, exfoliation force can be effectively applied between the graphene layers of the above graphite or primary exfoliated graphite by the pyrolysis of the above pyrolyzable foaming agent.

The pyrolysis of the above pyrolyzable foaming agent need not necessarily be performed in the step of pyrolyzing the above polymer. For example, when the pyrolysis temperature of the above pyrolyzable foaming agent is lower than the temperature at which the above radical polymerizable monomer spontaneously initiates polymerization, the above pyrolyzable foaming agent may be pyrolyzed when the above radical polymerizable monomer is polymerized by heating in the step of forming the above polymer. The pyrolysis of the above pyrolyzable foaming agent may be before the polymerization of the radical polymerizable monomer, after the polymerization, or simultaneous with the polymerization.

In order to reliably pyrolyze the above pyrolyzable foaming agent, after the above composition is heated to a temperature equal to or higher than the pyrolysis temperature of the above pyrolyzable foaming agent, the above temperature may be further maintained for a certain time. The time that the above composition is maintained in the vicinity of the above temperature is preferably in the range of 0.5 to 5 hours though depending on the type and amount of the pyrolyzable foaming agent used.

Second Method;

In the second method, in the step of providing a composition comprising graphite or primary exfoliated graphite and a polymer in which a radical polymerizable monomer is polymerized, the polymer being grafted on the graphite or primary exfoliated graphite, the polymer is heated to a temperature in the temperature range of 50° C. or higher and 400° C. or lower in the presence of the graphite or primary exfoliated graphite to graft the polymer on the graphite or primary exfoliated graphite. In other words, in the first method, a radical polymerizable monomer is polymerized in the presence of graphite or primary exfoliated graphite to form a polymer and promote the grafting of the polymer on the graphite or primary exfoliated graphite, whereas in the second method, by heating a previously obtained polymer to the above particular temperature range in the presence of graphite or primary exfoliated graphite, a polymer radical formed by pyrolyzing the polymer can be directly grafted on the graphite or primary exfoliated graphite.

As the polymer in the second method, an appropriate pyrolytic radical-forming polymer can be used.

Most organic polymers generate radicals at decomposition temperature. Therefore, as polymers that form radicals in the vicinity of the above decomposition temperature, many organic polymers can be used.

In the second method, the blending ratio between the above graphite or primary exfoliated graphite and the above polymer is not particularly limited and is desirably a ratio of 1:5 to 1:20 in terms of a weight ratio. By setting the blending ratio in this range, it is possible to exfoliate the graphite or primary exfoliated graphite more effectively to obtain the resin-retained partially exfoliated graphite effectively.

Also in the second method, as in the case of the first method, in the step of providing the composition, preferably, it is desired to further contain a pyrolyzable foaming agent in the composition. As in the case of the first method, the graphite or primary exfoliated graphite can be exfoliated much more effectively by heating that causes the pyrolysis of the polymer described later.

The pyrolyzable foaming agents that can be used are similar to those in the case of the first method. Therefore, preferably, it is desired to use the foaming agents having the structures represented by formula (1) to (4) described above.

Also in the second method, the blending ratio between the graphite or primary exfoliated graphite and the pyrolyzable foaming agent is not particularly limited, and the pyrolyzable foaming agent is preferably blended in the ratio of 100 to 300 parts by weight based on 100 parts by weight of the graphite or primary exfoliated graphite. When the blending ratio is in this range, the graphite or primary exfoliated graphite can be exfoliated much more effectively.

Also in the second method, the specific method for providing the composition is not limited. Examples of the specific method include a method of introducing the above polymer and graphite or primary exfoliated graphite into an appropriate solvent or dispersion medium and heating the mixture.

The polymer is grafted on the graphite or primary exfoliated graphite by the above heating. This heating temperature is desirably in the range of 50° C. or higher and 400° C. or lower. By setting the heating temperature in this temperature range, the polymer can be effectively grafted on the graphite. Thus, the graphite or primary exfoliated graphite can be exfoliated much more effectively. The reason for this is considered as follows.

By heating the polymer obtained by polymerizing the above radical polymerizable monomer, part of the polymer decomposes, and a radical is trapped in the graphene layers of the graphite or primary exfoliated graphite. Therefore, the polymer is grafted on the graphite or primary exfoliated graphite. Then, when the polymer is decomposed and fired in a heating step described later, a large stress is applied to the graft surface of the graphite or primary exfoliated graphite where the polymer is grafted. Therefore, it is considered that exfoliation force acts starting from the grafting point, and the distance between the graphene layers is effectively increased.

Third Method;

Examples of the third method can include a method of dissolving or dispersing the above graphite and the above polymer in an appropriate solvent. As such a solvent, tetrahydrofuran, methyl ethyl ketone, toluene, ethyl acetate, and the like can be used.

When the pyrolyzable foaming agent is used, the pyrolyzable foaming agent may be further added and dispersed or dissolved in the above solvent.

In the third method, as the above composition, a composition in which a polymer is adsorbed on graphite or primary exfoliated graphite is provided in a solvent. The method for adsorbing the polymer on the graphite or primary exfoliated graphite is not particularly limited. The polymer has adsorption properties on graphite, and therefore, a method of mixing the graphite or primary exfoliated graphite with the polymer in the above-described solvent can be used. Preferably, in order to adsorb the polymer on the graphite or primary exfoliated graphite more effectively, ultrasonic treatment is desirably carried out. The ultrasonic treatment method is not particularly limited. For example, a method of irradiation with ultrasonic waves at about 100 W and an oscillation frequency of about 28 kHz using an appropriate ultrasonic treatment apparatus can be used.

The ultrasonic treatment time is also not particularly limited and may be equal to or more than the time required for the polymer to be adsorbed on the graphite. For example, in order to adsorb polyvinyl acetate on the graphite, the ultrasonic treatment may be preferably maintained for about 30 minutes to 300 minutes.

It is considered that the adsorption of the polymer is due to the interaction of the surface energy of the graphite with the polymer.

Step of Exfoliating Graphite by Pyrolysis of Resin;

In all of the above first method, second method, and third method, after the composition is provided as described above, the polymer contained in the composition is pyrolyzed. Thus, the graphite or primary exfoliated graphite is exfoliated while part of the polymer is allowed to remain, and the resin-retained partially exfoliated graphite can be obtained. In order to perform the pyrolysis of the polymer in this case, the above composition may be heated to the pyrolysis temperature of the polymer or higher.

More specifically, the above composition is heated to the pyrolysis temperature of the polymer or higher, and the polymer is further fired. At this time, the polymer is fired to the extent that the polymer remains in the composition. Thus, the resin-retained partially exfoliated graphite can be obtained. For example, the pyrolysis temperature of polystyrene is about 380° C. to 450° C., the pyrolysis temperature of polyglycidyl methacrylate is about 400° C. to 500° C., and the pyrolysis temperature of polybutyral is about 550° C. to 600° C. in the air.

It is considered that the resin-retained partially exfoliated graphite can be obtained by the pyrolysis of the above polymer for the above-described reason, that is, because when the polymer grafted on the graphite is fired, large stress acts on the grafting point, and thus, the distance between the graphenes increases.

In the first method, it has been described that the heating for polymerizing the radical polymerizable monomer and the pyrolysis of the above polymer may be continuously carried out in the same heating step. Also in the second method, the heating step for grafting the above polymer on the graphite or primary exfoliated graphite and the heating step of pyrolyzing the above polymer may be continuously carried out.

There is no oxidation step in this pyrolysis treatment, and the deterioration of the obtained exfoliated graphite by oxidation is prevented. Therefore, the conductivity derived from the graphite is maintained.

(2) Step of Obtaining Active Material-Exfoliated Graphite Composite

In the present invention, the active material-exfoliated graphite composite is obtained by heating a raw material composition comprising the resin-retained partially exfoliated graphite provided as described above and an active material to fire and remove the resin and form a composite from the partially exfoliated graphite and the active material.

The resin of the resin-retained partially exfoliated graphite is removed by the heat treatment or chemical treatment, such as acid-alkali hydrolysis, of the above raw material composition. As described above, part of the resin may remain by the heat treatment or chemical treatment of the above raw material composition.

The pyrolysis temperature of the above fine particles is preferably higher than the pyrolysis temperature of the above resin. The heating of the above raw material composition is preferably performed at a temperature higher than the pyrolysis temperature of the above resin and lower than the pyrolysis temperature of the above active material. When the raw material composition is heated in this range of temperature, the active material can form a composite with the partially exfoliated graphite much more efficiently. More particularly, the heating temperature is preferably 200° C. or higher, more preferably 350° C. or higher, and is preferably 600° C. or lower, more preferably 550° C. or lower.

The above active material is not particularly limited, and a powdery active material powder can be used. The average particle diameter of the active material is 1 µm to 100 µm.

The blending ratio of the active material is not particularly limited and is desirably in the range of 5.2 to 900 parts by weight based on 100 parts by weight of the partially exfoliated graphite.

As the above active material, for example, an inorganic compound or a metal can be used. As such a material, at least one selected from the group consisting of Co, Mn, Ni, P, Sn, Ge, Si, Ti, Zr, V, Al, and compounds thereof is used.

When Si particles are used as the active material, it is preferred to heat a raw material composition comprising the resin-retained partially exfoliated graphite and Si particles, thereby doping the partially exfoliated graphite with the Si particles, that is, including the Si particles within the partially exfoliated graphite. This heating temperature is not particularly limited and is preferably 200° C. or higher, more preferably 400° C. or higher, and is preferably 600° C. or lower, more preferably 550° C. or lower.

By heating at a temperature in such a range, the Si particles enter between the graphene layers of the partially exfoliated graphite much more reliably. In other words, the Si particles enter portions where the graphemes of the partially exfoliated graphite are spaced, and the partially exfoliated graphite is doped with the Si particles. Thus, a Si composite carbonaceous material can be obtained. The above Si particles are not particularly limited, and various commercial Si powders can be used.

The average particle diameter of the Si particles is preferably about 1 μm to 30 μm. In such a range of the average particle diameter, the Si particles can be much more easily introduced between the graphene layers of the partially exfoliated graphite.

The blending ratio of the Si particles is not particularly limited and is desirably in the range of 10 to 900 parts by weight based on 100 parts by weight of the partially exfoliated graphite.

By heating the raw material composition comprising Si particles and the partially exfoliated graphite to the above temperature by an appropriate method, the partially exfoliated graphite can be doped with the Si particles as described above. Thus, the active material-exfoliated graphite composite can be obtained. When an organic compound is used as the above active material, a compound having a polyacene skeleton can be used. As the above compound having a polyacene skeleton, those having a structure in which a plurality of aromatic rings are condensed linearly or in a planar form are preferred. Examples thereof can include insoluble and infusible substrates having a polyacene skeleton structure described in Japanese Patent Publication No. 1-44212, Japanese Patent Publication No. 3-24024, WO95/08852, and the like.

(Negative Electrode Material for Lithium Ion Secondary Batteries)

A negative electrode material for lithium ion secondary batteries according to the present invention comprises the active material-exfoliated graphite composite of the present invention and a binder resin.

The above binder resin is not particularly limited, and, for example, styrene butadiene rubber, carboxymethyl cellulose, polyvinylidene fluoride, polyimide resins, (meth)acrylic resins, or acetal resins can be used. These may be used alone, or a plurality of these may be used in combination.

In the active material-exfoliated graphite composite of the present invention, partially exfoliated graphite and an active material that is in the form of particles capable of intercalating and deintercalating or adsorbing and desorbing lithium ions form a composite. In addition, the average particle diameter of the above active material is 1 μm or more and 100 μm or less, and the average particle diameter is relatively large. Therefore, in a lithium ion secondary battery using the negative electrode material for lithium ion secondary batteries according to the present invention, the initial capacity is large, and moreover, deterioration in charge and discharge characteristics is less likely to occur.

Further, when Si particles are used as the active material, the Si particles can be bonded to a larger amount of lithium than carbon. In other words, when Si particles are used, the theoretical capacity is far higher than when a carbon material is used. However, when Si particles are conventionally used, the volume change due to charge and discharge is large, and the life characteristics, that is, charge and discharge cycle characteristics, may decrease.

Therefore, when Si particles are used as the active material, it is preferred that the space between the graphene layers of the partially exfoliated graphite is doped with the Si particles, that is, the Si particles are included between the graphene layers of the partially exfoliated graphite. In this case, it is considered that the Si particles closely inserted between the graphene layers having high conductivity are protected by the graphene having a stable structure also against volume change in the occurrence of the intercalation and deintercalation of lithium ions, and therefore, the deterioration in charge and discharge cycle characteristics is much smaller. Therefore, when an active material such as Si particles having high theoretical capacity is used, a lithium ion secondary battery having much better charge and discharge characteristics and moreover excellent life characteristics can be provided.

The negative electrode material for lithium ion secondary batteries may comprise a conductive promoter.

Examples of the conductive promoter can include ketjen black and acetylene black. Preferably, at least one selected from the group consisting of ketjen black and acetylene black is desirably used. In this case, the conductivity as an electrode material can be improved much more.

The addition ratio of the above conductive promoter is not particularly limited and is desirably about 1 to 20 parts by weight based on 100 parts by weight of the active material. When the addition ratio is in this range, deterioration in characteristics as the negative electrode of a lithium ion secondary battery is less likely to be caused, and the conductivity as an electrode material can be improved much more.

(Method for Producing Negative Electrode Material for Lithium Ion Secondary Batteries)

A method for producing a negative electrode material for lithium ion secondary batteries according to the present invention comprises the steps of obtaining an active material-exfoliated graphite composite according to the above-described production method; (3) providing a composition for shaping; and (4) shaping the provided composition for shaping.

(3) Step of Providing Composition for Shaping

In this step, a composition for shaping comprising the active material-exfoliated graphite composite of the present invention described above, a binder resin, and a solvent is provided. Here, the binder resin is not particularly limited. As such a binder resin, preferably, at least one selected from the group consisting of styrene butadiene rubber, carboxymethyl cellulose, polyvinylidene fluoride, a polyimide resin, a (meth)acrylic resin, and an acetal resin is used. In other words, an aqueous binder resin may be used, or a nonaqueous binder resin may be used. As the aqueous binder resin, the above styrene butadiene rubber (SBR) or carboxymethyl cellulose (CMC) is preferably used. As the nonaqueous binder resin, at least one of the above polyvinylidene fluoride (PVDF), polyimide resin, (meth)acrylic resin, and acetal resin is preferably used. The above (meth)acrylic resin represents a methacrylic resin and an acrylic resin, and especially an acrylic resin is preferred. Of the above acetal resin, a butyral resin is preferred.

In order to make the shaping of the above composition easy, and in order to make kneading easy, an appropriate solvent is added. Such a solvent is not particularly limited, and organic solvents such as tetrahydrofuran (THF), ethanol, and N-methylpyrrolidone (NMP) or water can be used.

The blending ratio between the active material-exfoliated graphite composite and the binder resin in the above composition is not particularly limited, and the binder resin is desirably blended in the ratio of about 2 parts by weight to 20 parts by weight based on 100 parts by weight of the active material-exfoliated graphite composite. When the blending ratio is in this range, a negative electrode material for lithium ion secondary batteries that develops sufficient functions as a negative electrode can be provided. When the blending ratio of the binder resin is too low, molding may be difficult.

(4) Step of Shaping Provided Composition for Shaping

In this step, by shaping the composition for shaping provided as described above, a negative electrode material for lithium ion secondary batteries is obtained. For this shaping, various forming methods may be used, or the shaping may be performed by applying and drying the above composition.

Particularly, as described later, the negative electrode material for lithium ion secondary batteries according to the present invention can be used alone as a negative electrode material for lithium ion secondary batteries without using metal foil such as Cu foil. Therefore, it is also possible to easily form the negative electrode for lithium ion secondary batteries, for example, by applying the above composition to one surface of a separator and drying it.

In the present invention, in the step of forming a composite from the above resin-retained partially exfoliated graphite and an active material, a conductive promoter may be further mixed. In this case, the conductivity of the negative electrode made can be improved even more.

(Lithium Ion Secondary Battery)

A lithium ion secondary battery according to the present invention comprises the above negative electrode material for lithium ion secondary batteries as a negative electrode. Therefore, the initial capacity is large, and deterioration in charge and discharge cycle characteristics is less likely to occur.

Generally, a lithium ion secondary battery comprises a negative electrode, a positive electrode, and a separator disposed between the negative electrode and the positive electrode. As this negative electrode, the negative electrode material for lithium ion secondary batteries according to the present invention is preferably used.

Particularly, the above negative electrode material for lithium ion secondary batteries develops a scale in which it constitutes a negative electrode alone. Therefore, it is also possible to constitute a negative electrode having no metal foil and comprising only the above negative electrode material for lithium ion secondary batteries. In this case, the simplification and cost reduction of the production process can be achieved. Particularly, with a structure in which the above negative electrode material for lithium ion secondary batteries is formed on one surface of a separator as a coating, much more simplification and cost reduction of the production process can be achieved.

In order to form the above negative electrode material for lithium ion secondary batteries as a coating as described above, the above composition which is provided for production of the above-described negative electrode material may be applied to one surface of a separator and then dried. Therefore, the separator and the negative electrode can be formed in a simple step.

Next, the present invention will be clarified by giving specific Examples and Comparative Examples of the present invention. The present invention is not limited to the following Examples.

Example 1

(Preparation of Resin-retained Partially Exfoliated Graphite)

10 g of polyglycidyl methacrylate (manufactured by NOF CORPORATION, product number "G2050M", weight average molecular weight=250000, pyrolysis temperature=350° C.) was dissolved in tetrahydrofuran to obtain a 10% by weight solution of polyglycidyl methacrylate. 1000 mg of expanded graphite (manufactured by TOYO TANSO CO., LTD., trade name "PF Powder 8") was added to this polyglycidyl methacrylate solution to provide a mixture.

Next, the above mixture was irradiated with ultrasonic waves at 100 W and an oscillation frequency of 28 kHz for 120 minutes using an ultrasonic treatment apparatus (manufactured by Honda Electronics Co., Ltd.). Thus, a composition in which the above expanded graphite was dispersed in the polyglycidyl methacrylate was obtained. This composition was sheet-molded to a thickness of 100 to 1000 µm by a casting method. The obtained sheet was heated and dried at a temperature of 110° C. for 2 hours.

After the drying, the heating step of maintaining the sheet at a temperature of 430° C. for 0.5 hours was carried out. Thus, the above polyglycidyl methacrylate was pyrolyzed to obtain resin-retained partially exfoliated graphite. In this resin-retained partially exfoliated graphite, part of the polyglycidyl methacrylate remains.

A burning test was performed in which the obtained resin-retained partially exfoliated graphite was heated to 30° C. to 1000° C. at a rate of 10° C./rain under an air atmosphere. The TG/DTA measurement results when this burning test was performed are shown in FIG. 1. In FIG. 1, TG is shown by the broken line, and DTA is shown by the solid line.

From FIG. 1, it was confirmed that a peak derived from graphite was present between 700° C. and 800° C., and the peak of the polyglycidyl methacrylate as a remaining resin was present in the vicinity of 500° C.

The XRD spectrum of the obtained resin-retained partially exfoliated graphite is shown by the solid line in FIG. 2. For comparison, the XRD spectrum of the expanded graphite (manufactured by TOYO TANSO CO., LTD., trade name "PF Powder 8") that is raw material graphite is shown by the broken line in FIG. 2.

From FIG. 2, the height of the peak of the solid line is lower than the height of the peak of the broken line, and therefore, it was confirmed that in the obtained resin-retained partially exfoliated graphite, the graphite layers were partially exfoliated when the polyglycidyl methacrylate was pyrolyzed.

FIG. 3 is a scanning electron micrograph at 1000× magnification of the resin-retained partially exfoliated graphite obtained as described above. FIG. 4 is a scanning electron micrograph at 5000× magnification of the resin-retained partially exfoliated graphite obtained as described above. As is clear from FIG. 3 and FIG. 4, it is seen that in the obtained resin-retained partially exfoliated graphite, the graphite layers are partially spaced. The BET specific surface area of the obtained resin-retained partially exfoliated graphite was 270 $m^2/g$.

500 g of ethanol was added to 4.93 g of the resin-retained partially exfoliated graphite obtained as described above, and the mixture was irradiated with ultrasonic waves at 100 W and an oscillation frequency of 28 kHz for 0.5 hours using an ultrasonic treatment apparatus (manufactured by Honda Electronics Co., Ltd.), to obtain a dispersion. After the irradiation, 0.3 g of Si particles having an average particle diameter of 10.4 µm (manufactured by ALDRICH, trade name "Silicon powder-325 mesh", content of particles of 1 µm or less: 16.3%) were added, and further, the mixture was irradiated with ultrasonic waves at an oscillation frequency of 28 kHz for 3.5 hours to adsorb the Si particles on the resin-retained partially exfoliated graphite.

Thereafter, the dispersion was suction-filtered to remove the ethanol as a dispersion medium. After the removal, the resin-retained partially exfoliated graphite on which the Si particles were adsorbed was heated at 110° C. for 1 hour, at 150° C. for 1 hour, and at 560° C. for 1 hour in this order. Thus, partially exfoliated graphite in which Si particles were included within, that is, an active material-exfoliated graphite composite, was obtained. In the obtained composite, the content of Si was 17% by weight.

The XRD spectrum was measured for the active material-exfoliated graphite composite obtained as described above. The result is shown by the broken line in FIG. 5. For comparison, the XRD spectrum of the resin-retained partially exfoliated graphite is shown by the solid line in FIG. 5.

As is clear from the broken line in FIG. 5, it is seen that for the obtained active material-exfoliated graphite composite, in addition to a peak in the vicinity of 26 degrees derived from the 002 plane of graphite, a peak in the vicinity of 28 degrees derived from the Si particles as a raw material powder appears.

FIG. 6 is a scanning electron micrograph at 5000× magnification of the active material-exfoliated graphite composite obtained in this Example. As is clear from FIG. 6, it is seen that in this active material-exfoliated graphite composite, the Si particles are inserted between the graphene layers. In other words, it is seen that the Si particles are included within the partially exfoliated graphite.

540 mg of the active material-exfoliated graphite composite obtained as described above, 3 g of an ethanol solution containing 2% by weight of a butyral resin (manufactured by SEKISUI CHEMICAL CO., LTD., trade name "LB-1") as a binder resin, and 6 g of ethanol were kneaded in an agate mortar. After the kneading, ultrasonic treatment was performed for 30 minutes using an ultrasonic homogenizer (manufactured by MISONIX, product number "ULTRASONIC PROCESSOR XL"), to make a coating liquid. The coating liquid made was applied to Cu foil by an applicator to make an electrode sheet.

The electrode sheet obtained in this manner, that is, a negative electrode material for lithium ion secondary batteries, was dried under reduced pressure at 80° C. for 15 hours and then heated to 110° C. and dried under reduced pressure for 1 hour.

A scanning electron micrograph at 10000× magnification of a cross section of the obtained negative electrode material for lithium ion secondary batteries is shown in FIG. 7. As is clear from FIG. 7, it is seen that a sheet comprising partially exfoliated graphite in which Si particles are included between graphene layers is obtained.

Next, the obtained negative electrode material for lithium ion secondary batteries was punched into a circular sheet having a diameter of 10 mm.

A half cell was made using this circular sheet-like negative electrode material for lithium ion secondary batteries and using an UFO type battery cell (flat cell: battery cell for experimentation of a lithium ion secondary battery). All subsequent experiments were performed in a glove box under an argon gas atmosphere.

More specifically, the above circular sheet comprising the negative electrode material for lithium ion secondary batteries was vacuum-dried at 110° C. for 14 hours and carried into a glove box in a state in which the vacuum was maintained as it was. At the same time, the UFO type battery cell (flat cell: battery cell for experimentation of a lithium ion secondary battery) was carried into the glove box. The schematic configuration of the half cell made for electrical characteristic evaluation is schematically shown in FIG. 8 in an exploded perspective view.

As shown in FIG. 8, a spring 3, a current collector 4, a jig comprising a resin 5, a sheet comprising a negative electrode material for lithium ion secondary batteries 6, a separator 7, and a metal lithium piece 8 are provided between a working electrode 1 and a counter electrode 2 in order from the working electrode 1 side.

As the metal lithium piece 8, Li foil having a thickness of 0.2 mm and a diameter of 14 mm was used. As the separator 7, a separator (manufactured by SEKISUI CHEMICAL CO., LTD., trade name "ESFINO (23 µm)") punched into a diameter of 24 mm was used. As the electrolytic solution, a 1 mol/L LiBF4/EC:DEC (1:1 v/v %) electrolytic solution (manufactured by KISHIDA CHEMICAL Co., LTD.) was used.

After the operation was stopped for 12 hours, the UFO type battery cell assembled as described above was charged by CCCV control with current: 0.2 C and target voltage: 0.002 V, and after 0.002 V was reached, 0.002 V was maintained for 10 minutes. After the operation was stopped for 10 seconds, the UFO type battery cell was discharged to 3 V by CV control with current: 0.2 C, and then, the operation was stopped for 1 minute.

A cycle comprising the above charge and discharge was repeated. The charge and discharge test results are shown in the following Table 1.

As is clear from Table 1, it is seen that according to this Example, the initial charge capacity, the initial discharge capacity, and the initial coulombic efficiency are high, and even if charge and discharge are repeated, the deterioration in charge and discharge characteristics is small.

Example 2

(Preparation of Resin-Retained Partially Exfoliated Graphite) 20 g of expanded graphite (manufactured by TOYO TANSO CO., LTD., trade name "PF Powder 8", BET surface area=22 m²/g), 40 g of ADCA having the structure represented by formula (1) (manufactured by EIWA CHEMICAL IND. CO., LTD, trade name "AC #R-K3", pyrolysis temperature 210° C.) as a pyrolyzable foaming agent, and 400 g of polypropylene glycol (manufactured by Sanyo Chemical Industries, Ltd., product number: SANNIX GP-3000, number average molecular weight=3000) were mixed with 400 g of tetrahydrofuran as a solvent to provide a raw material composition. The raw material composition was irradiated with ultrasonic waves at 100 W and an oscillation frequency: 28 kHz for 5 hours using an ultrasonic treatment apparatus (manufactured by Honda Electronics Co., Ltd.). The polypropylene glycol (PPG) was adsorbed on the expanded graphite by the ultrasonic treatment. In this manner, a composition in which polypropylene glycol was adsorbed on expanded graphite was provided.

After the above ultrasonic irradiation, the above composition was molded by a solution casting method, maintained at a drying temperature of 80° C. for 2 hours, then maintained at a temperature of 110° C. for 1 hour. Thereafter, the above composition was maintained at a temperature of 150° C. for 1 hour, and further maintained at a temperature of 230° C. for 2 hours. Thus, the above ADCA was pyrolyzed and foamed in the above composition.

Next, the heating step of maintaining the above composition at a temperature of 430° C. for 1.5 hours was carried out. Thus, the above polypropylene glycol was pyrolyzed to obtain resin-retained partially exfoliated graphite. In this resin-retained partially exfoliated graphite, part of the polypropylene glycol remains.

A burning test was performed in which the obtained resin-retained partially exfoliated graphite was heated to 30° C. to 1000° C. at a rate of 10° C./min under an air atmosphere. The TG/DTA measurement results when this burning test was performed are shown in FIG. 9. TG shows the broken line, and DTA shows the solid line.

From FIG. 9, it was confirmed that a peak derived from graphite was present between 700° C. and 800° C., and the peak of the polypropylene glycol as a remaining resin was present in the vicinity of 500° C.

The XRD spectrum of the obtained resin-retained partially exfoliated graphite is shown by the solid line in FIG. 10. For comparison, the XRD spectrum of the expanded graphite PF powder that is raw material graphite is shown by the broken line in FIG. 10. From FIG. 10, it was confirmed that in the resin-retained partially exfoliated graphite, the graphite layers were partially exfoliated when the polypropylene glycol was pyrolyzed.

FIG. 11 is a scanning electron micrograph at 1000× magnification of the resin-retained partially exfoliated graphite obtained as described above. FIG. 12 is a scanning electron micrograph at 5000× magnification of the resin-retained partially exfoliated graphite obtained as described above. As is clear from FIG. 11 and FIG. 12, it is seen that the graphite layers are partially spaced. The BET specific surface area of the obtained resin-retained partially exfoliated graphite was 150 $m^2/g$.

A solution obtained by adding 40 g of ethanol to 1.163 g of the resin-retained partially exfoliated graphite obtained as described above, and a solution obtained by adding 1.5 g of ethanol to 0.2 g of Si particles having an average particle diameter of 10.4 μm (manufactured by ALDRICH, trade name "Silicon powder-325 mesh", content of particles of 1 μm or less: 16.3%) were made, and the solutions were irradiated with ultrasonic waves at 100 W and an oscillation frequency of 28 kHz for 5 hours using an ultrasonic treatment apparatus (manufactured by Honda Electronics Co., Ltd.).

Then, while the solution of the resin-retained partially exfoliated graphite was stirred by a stirrer, the solution of the Si particles was dropped, and the mixture was stirred for 1 hour to adsorb the Si particles on the resin-retained partially exfoliated graphite.

Thereafter, the obtained solution was suction-filtered to remove the ethanol as a dispersion medium. After the removal, the resin-retained partially exfoliated graphite on which the Si particles were adsorbed was heated at 110° C. for 1 hour, at 150° C. for 1 hour, and at 500° C. for 2 hours in this order. Thus, partially exfoliated graphite in which Si particles were included within, that is, an active material-exfoliated graphite composite, was obtained. In the obtained composite, the content of Si was 20% by weight.

The XRD spectrum was measured for the active material-exfoliated graphite composite obtained as described above. The result is shown by the broken line in FIG. 13. For comparison, the XRD spectrum of the resin-retained partially exfoliated graphite is shown by the solid line in FIG. 13.

As is clear from the broken line in FIG. 13, it is seen that for the obtained active material-exfoliated graphite composite, in addition to a peak in the vicinity of 26 degrees derived from the 002 plane of graphite, a peak in the vicinity of 28 degrees derived from the Si particles as a raw material powder appears.

0.5 g of the active material-exfoliated graphite composite obtained as described above, a small amount of NMP, and 0.25 g of an NMP solution containing 10% by weight of PVDF (manufactured by KISHIDA CHEMICAL Co., Ltd.) as a binder resin were kneaded in an agate mortar to make a coating liquid. The obtained coating liquid was used and applied to Cu foil by an applicator to make an electrode sheet.

The electrode sheet obtained as described above, that is, a negative electrode material for lithium ion secondary batteries, was dried under reduced pressure at 80° C. for 15 hours and then heated to 110° C. and dried under reduced pressure for 1 hour.

Next, the negative electrode material for lithium ion secondary batteries obtained as described above was punched into a circular sheet having a diameter of 10 mm. A half cell was made using this circular sheet-like negative electrode material for lithium ion secondary batteries and using an UFO type battery cell (flat cell: battery cell for experimentation of a lithium ion secondary battery). All subsequent experiments were performed in a glove box under an argon gas atmosphere.

More specifically, the above circular sheet made of the negative electrode material for lithium ion secondary batteries was vacuum-dried at 110° C. for 14 hours and carried into a glove box in a state in which the vacuum was maintained as it was. At the same time, the UFO type battery cell (flat cell: battery cell for experimentation of a lithium ion secondary battery) was carried into the glove box, and the UFO type battery cell was provided and charge and discharge evaluation was performed as in Example 1. The results are shown in the following Table 1.

As is clear from Table 1, it is seen that according to this Example, the initial charge capacity, the initial discharge capacity, and the initial coulombic efficiency are high, and even if charge and discharge are repeated, the deterioration in charge and discharge characteristics is small.

Example 3

A liquid obtained by adding 27 g of ethanol to 0.675 g of the resin-retained partially exfoliated graphite obtained in Example 2, and a solution obtained by adding 50 g of ethanol to 0.5 g of Si particles having an average particle diameter of 10.4 μm (manufactured by ALDRICH, trade name "Silicon powder-325 mesh", content of particles of 1 μm or less: 16.3%) were made, and the solutions were each irradiated with ultrasonic waves at 100 W and an oscillation frequency of 28 kHz for 5 hours using an ultrasonic treatment apparatus (manufactured by Honda Electronics Co., Ltd.).

Then, while the solution of the Si particles was stirred by a stirrer, the solution of the resin-retained partially exfoliated graphite was dropped, and the mixture was stirred for 2.5 hours to adsorb the Si particles on the resin-retained partially exfoliated graphite.

Thereafter, the obtained solution was suction-filtered to remove the ethanol as a dispersion medium. After the removal, the resin-retained partially exfoliated graphite on which the Si particles were adsorbed was heated at 110° C. for 1 hour, at 150° C. for 1 hour, and at 500° C. for 2 hours in this order. Thus, partially exfoliated graphite in which Si particles were included within, that is, an active material-exfoliated graphite composite, was obtained.

A burning test was performed in which the active material-exfoliated graphite composite obtained as described above was heated to 30° C. to 1000° C. at a rate of 10° C./min under an air atmosphere. The TG/DTA measurement results when this burning test was performed are shown in FIG. 14. TG shows the broken line, and DTA shows the solid line.

From FIG. 14, the peak of the polypropylene glycol present in FIG. 9 disappears, and therefore, it is seen that the remaining polypropylene glycol is eliminated by heating at 500° C. for 2 hours. In addition, from TG %, it is also seen that a composite in which 50% by weight of Si is incorporated is provided as targeted.

The XRD spectrum was measured for the active material-exfoliated graphite composite obtained as described above. The result is shown by the broken line in FIG. 15. For comparison, the XRD spectrum of the resin-retained partially exfoliated graphite is shown by the solid line in FIG. 15.

As is clear from the broken line in FIG. 15, it is seen that for the obtained active material-exfoliated graphite composite, in addition to a peak in the vicinity of 26 degrees derived from the 002 plane of graphite, a peak in the vicinity of 28 degrees derived from the Si particles as a raw material powder appears.

Except that the active material-exfoliated graphite composite obtained in this manner was used, a negative electrode material for lithium ion secondary batteries was made and charge and discharge evaluation was performed as in Example 2. The results are shown in the following Table 1.

As is clear from Table 1, it is seen that according to this Example, the initial charge capacity, the initial discharge capacity, and the initial coulombic efficiency are much higher, and even if charge and discharge are repeated, the deterioration in charge and discharge characteristics is small.

Example 4

A liquid obtained by adding 27 g of ethanol to 0.675 g of the resin-retained partially exfoliated graphite obtained in Example 2, and a solution obtained by adding 50 g of ethanol to 0.5 g of a polyacene compound "PAHs" having an average particle diameter of 4.5 µm and manufactured by KRI (content of particles of 1 µm or less: 0%) were made, and the solutions were each irradiated with ultrasonic waves at 100 W and an oscillation frequency of 28 kHz for 5 hours using an ultrasonic treatment apparatus (manufactured by Honda Electronics Co., Ltd.). Then, while the solution of PAHs was stirred by a stirrer, the solution of the resin-retained partially exfoliated graphite was dropped, and the mixture was stirred for 2.5 hours to adsorb PAHs particles on the resin-retained partially exfoliated graphite.

Thereafter, the obtained solution was suction-filtered to remove the ethanol as a dispersion medium. After the removal, the resin-retained partially exfoliated graphite on which PAHs was adsorbed was heated at 110° C. for 1 hour, at 150° C. for 1 hour, and at 500° C. for 2 hours in this order. Thus, partially exfoliated graphite in which PAHs was included within, that is, an active material-exfoliated graphite composite, was obtained.

A burning test was performed in which the active material-exfoliated graphite composite obtained as described above was heated to 30° C. to 1000° C. at a rate of 10° C./min under an air atmosphere. The TG/DTA measurement results when this burning test was performed are shown in FIG. 16. TG shows the broken line, and DTA shows the solid line.

From FIG. 16, the peak of the polypropylene glycol present in FIG. 9 disappears, and therefore, it is seen that the remaining polypropylene glycol is eliminated by heating at 500° C. for 2 hours. In addition, from TG %, it is also seen that a composite in which 50% by weight of PAHs is incorporated is provided.

Except that the active material-exfoliated graphite composite obtained in this manner was used, a negative electrode material for lithium ion secondary batteries was made as in Example 2. For charge and discharge evaluation, after the operation was stopped for 12 hours, charge was performed by CCCV control with current: 0.1 C and target voltage: 0.002 V, and after 0.002 V was reached, 0.002 V was maintained for 10 hours. After the operation was stopped for 10 seconds, discharge was performed to 3 V by CV control with current: 0.2 C, and then, the operation was stopped for 1 minute. The results are shown in the following Table 1.

As is clear from Table 1, it is seen that according to this Example, the initial charge capacity, the initial discharge capacity, and the initial coulombic efficiency are much higher, and even if charge and discharge are repeated, the deterioration in charge and discharge characteristics is small.

Comparative Example 1

A negative electrode material for lithium ion secondary batteries was made and charge and discharge evaluation was performed as in Example 1 except that instead of Si particles having an average particle diameter of 10.4 µm (manufactured by ALDRICH, trade name "Silicon powder—325 mesh", content of particles of 1 µm or less: 16.3%), Si particles having an average particle diameter of 616 nm (manufactured by ALDRICH, trade name "Silicon nanopowder", content of particles of 1 µm or less: 94.9%) was used. The results are shown in the following Table 1.

Comparative Example 2

A negative electrode material for lithium ion secondary batteries was made and charge and discharge evaluation was performed as in Example 2 except that Si particles having an average particle diameter of 616 nm (manufactured by ALDRICH, trade name "Silicon nanopowder", content of particles of 1 µm or less: 94.9%) was used as Si particles. The results are shown in the following Table 1.

Comparative Example 3

An active material-expanded graphite composite was made by performing treatment as in Example 2 except that instead of the resin-retained partially exfoliated graphite used in Example 2, expanded graphite (manufactured by TOYO TANSO CO., LTD., trade name "PF Powder 8") was used. 540 mg of the obtained active material-expanded graphite composite, 3 g of an ethanol solution containing 2% by weight of a butyral resin (manufactured by SEKISUI CHEMICAL CO., LTD., trade name "LB-1") as a binder resin, and a small amount of ethanol were kneaded in an agate mortar to make a coating liquid. The obtained coating liquid was used and applied to Cu foil by an applicator to make an electrode sheet.

The electrode sheet obtained in this manner, that is, a negative electrode material for lithium ion secondary batteries, was dried under reduced pressure at 80° C. for 15 hours and then heated to 110° C. and dried under reduced pressure for 1 hour. Using the obtained negative electrode material for lithium ion secondary batteries, an UFO type battery cell was provided and charge and discharge evaluation was performed as in Example 1. The results are shown in the following Table 1.

Comparative Example 4

A negative electrode material for lithium ion secondary batteries was made and charge and discharge evaluation was performed as in Example 3 except that Si particles having an average particle diameter of 616 nm (manufactured by ALDRICH, trade name "Silicon nanopowder", content of particles of 1 μm or less: 94.9%) was used as Si particles. The results are shown in the following Table 1.

TABLE 1

| | Initial charge capacity (mAh/g) | Initial charge capacity efficiency with respect to theoretical capacity | Initial discharge capacity (mAh/g) | Coulombic efficiency (%) | | | | |
|---|---|---|---|---|---|---|---|---|
| | | | | 1 cycle | 2 cycles | 3 cycles | 4 cycles | 5 cycles |
| Ex. 1 | 669.3 | 65.4% | 568.1 | 84.9 | 90.8 | 92.3 | 92.7 | 93.1 |
| Ex. 2 | 894.5 | 78.6% | 670.5 | 75 | 93.6 | 93.8 | 93.6 | 94 |
| Ex. 3 | 2139.3 | 94.5% | 1825.8 | 85.3 | 95.9 | 95.0 | 94.6 | 94.7 |
| Ex. 4 | 467.4 | 62.8% | 435.6 | 93.2 | 94.3 | 93.6 | 93.0 | 93.0 |
| Comp. Ex. 1 | 367.3 | 35.9% | 252.4 | 66.7 | 93.2 | 94.4 | 95.3 | 96.2 |
| Comp. Ex. 2 | 350.1 | 37.0% | 187.7 | 53.6 | 86.9 | 90.9 | 92.6 | 93.8 |
| Comp. Ex. 3 | Coating state is poor, and evaluation is impossible | | | | | | | |
| Comp. Ex. 4 | 323 | 13.7% | 218.3 | 67.6 | 90.5 | 92.3 | 93.8 | 94.7 |

REFERENCE SIGNS LIST

1: working electrode
2: counter electrode
3: spring
4: current collector
5: jig
6: sheet
7: separator
8: metal lithium piece

The invention claimed is:

1. An active material-exfoliated graphite composite comprising:
   partially exfoliated graphite having a structure in which primary graphite having an original graphite structure is partially exfoliated; and
   an active material that is in the form of particles capable of intercalating and deintercalating lithium ions by composite formation with the partially exfoliated graphite, or particles capable of adsorbing and desorbing lithium ions by composite formation with the partially exfoliated graphite, wherein
   the active material has an average particle diameter of 10.4 μm or more and 100 μm or less, and
   the partially exfoliated graphite has an exfoliated structure in an edge part and retains the original graphite structure of the primary graphite in a center part.

2. The active material-exfoliated graphite composite according to claim 1, wherein the active material is included within the partially exfoliated graphite.

3. The active material-exfoliated graphite composite according to claim 1, wherein the active material is in the form of particles of at least one selected from the group consisting of Co, Mn, Ni, P, Sn, Ge, Si, Ti Zr V, Al, and compounds thereof, and a compound having a polyacene skeleton.

4. The active material-exfoliated graphite composite according to claim 1, wherein the active material is in the form of particles comprising Si or a compound of Si.

5. The active material-exfoliated graphite composite according to claim 1, wherein the active material has a content of 5% by weight or more and 90% by weight or less.

6. A negative electrode material for lithium ion secondary batteries comprising the active material-exfoliated graphite composite according to claim 1 and a binder resin.

7. The negative electrode material for lithium ion secondary batteries according to claim 6, wherein the binder resin is at least one selected from the group consisting of styrene butadiene rubber, carboxymethyl cellulose, polyvinylidene fluoride, a polyimide resin, a (meth)acrylic resin, and an acetal resin.

8. A lithium ion secondary battery comprising the negative electrode material for lithium ion secondary batteries according to claim 6 as a negative electrode.

9. The lithium ion secondary battery according to claim 8 comprising the negative electrode comprising the negative electrode material for lithium ion secondary batteries, a positive electrode, and a separator disposed between the negative electrode and the positive electrode.

10. The lithium ion secondary battery according to claim 8, wherein the negative electrode has no metal foil and comprises the negative electrode material for lithium ion secondary batteries.

11. The lithium ion secondary battery according to claim 9, wherein the negative electrode is formed on one surface of the separator as a coating obtained by providing the negative electrode material for lithium ion secondary batteries on the one surface.

12. The active material-exfoliated graphite composite according to claim 1, wherein the partially exfoliated graphite is obtained by pyrolyzing a resin in a composition in which the resin is fixed to the primary graphite by grafting or adsorption, said pyrolyzing permitting a portion of the resin to remain in the partially exfoliated graphite.

13. The active material-exfoliated graphite composite according to claim 12, wherein said resin is selected from the group consisting of polypropylene glycol, polyglycidyl methacrylate, polyvinyl acetate, polytetramethylene ether glycol, polystyrene, polyethylene glycol, polybutyral, and polyacrylic acid.

* * * * *